(12) United States Patent
Morooka et al.

(10) Patent No.: US 7,880,082 B2
(45) Date of Patent: Feb. 1, 2011

(54) SOLID ELECTROLYTE, PHOTOELECTRIC CONVERTER AND PROCESS FOR PRODUCING THE SAME

(75) Inventors: Masahiro Morooka, Kanagawa (JP); Yusuke Suzuki, Kanagawa (JP); Kazuhiro Noda, Kanagawa (JP)

(73) Assignee: Sony Corporation, Tokyo (JP)

( * ) Notice: Subject to any disclaimer, the term of this patent is extended or adjusted under 35 U.S.C. 154(b) by 898 days.

(21) Appl. No.: 10/511,012

(22) PCT Filed: Apr. 10, 2003

(86) PCT No.: PCT/JP03/04562

§ 371 (c)(1),
(2), (4) Date: Jun. 13, 2005

(87) PCT Pub. No.: WO03/085680

PCT Pub. Date: Oct. 16, 2003

(65) Prior Publication Data

US 2005/0263182 A1    Dec. 1, 2005

(30) Foreign Application Priority Data

Apr. 11, 2002    (JP) .............................. 2002-109427

(51) Int. Cl.
    *H01L 31/00*    (2006.01)
(52) U.S. Cl. ....................... 136/263; 528/902
(58) Field of Classification Search ................ 136/263, 136/257; 528/902–906
    See application file for complete search history.

(56) References Cited

U.S. PATENT DOCUMENTS 4,585,581 A    4/1986    Skotheim 4,902,440 A *  2/1990   Takeyama et al. ...... 252/182.18
6,291,763 B1 * 9/2001   Nakamura ................... 136/256

FOREIGN PATENT DOCUMENTS

| EP | 1093131 A2 | 4/2001 |
| EP | 1387430 A1 | 2/2004 |
| JP | 8-88030 A | 4/1996 |
| JP | 2000-306605 A | 11/2000 |

(Continued)

OTHER PUBLICATIONS

Regan et al., "A low-cost, high efficiency solar cell bases on dye-sensitized colloidal $TiO_2$ films," *Nature*, vol. 353, Oct. 24, 1991, pp. 737-740.
Nazeeruddin et al., "Acid-Base Equilibria of (2,2'-Bipyrid1-4,4'—dicarboxylic acid)rutheniUm(II) Complexes and the Effect of Protonation on Charge—Transfer Sensitization of Nanocrystalline Titania," *Inorganic Chemistry*, vol. 38, No. 26, 1999, pp. 6298-6305.
Arakawa Hironori, "Recent Advances in Research and Development for Dye-Sensitized Solar Cells," 2001, pp. 45-47, ISBN4-88231-314-6.

*Primary Examiner*—Nam X Nguyen
*Assistant Examiner*—J. Christopher Ball
(74) *Attorney, Agent, or Firm*—Wolf, Greenfield & Sacks, P.C.

(57) ABSTRACT

The present invention relates to a solid electrolyte having superior conductive properties and reliability, a photovoltaic device using this electrolyte, and manufacturing methods thereof. The solid electrolyte of the present invention is a solid electrolyte having an electrolyte composition and a matrix polymer. The matrix polymer is formed by polymerization of a first compound having at least two isocyanate groups and a second compound having at least two nucleophilic groups containing active hydrogen in accordance with a polyaddition reaction, and the polymerization is performed after a precursor for the matrix polymer is brought into contact with a surface on which the solid electrolyte is to be formed.

13 Claims, 3 Drawing Sheets

FOREIGN PATENT DOCUMENTS

| | | |
|---|---|---|
| JP | 2001-110462 A | 4/2001 |
| JP | 2001-160427 A | 6/2001 |
| JP | 2001-273938 A | 10/2001 |
| JP | 2001-313074 A | 11/2001 |
| JP | 2002-42879 A | 2/2002 |
| JP | 2002-289271 A | 10/2002 |
| WO | WO 97/08719 * | 3/1997 |
| WO | WO 02/078115 A1 | 10/2002 |

* cited by examiner

SOLID ELECTROLYTE, PHOTOELECTRIC CONVERTER AND PROCESS FOR PRODUCING THE SAME

TECHNICAL FIELD

The present invention relates to solid electrolytes, and more particularly, relates to a highly reliable solid electrolyte having superior conductive properties, a photovoltaic device using this solid electrolyte, and manufacturing methods thereof.

BACKGROUND ART

When fossil fuels such as coal and petroleum are used as an energy source, it has been believed that carbon dioxide which is by-produced causes global warming. In addition, when atomic energy is used, pollution may be caused by radioactive rays in some cases. In recent years in which environmental issues have been actively discussed, excessive dependence on the energies described above may result in serious problems.

On the other hand, since solar cells, which are photovoltaic devices in which sunlight is converted into electric energy, use sunlight as an energy source, the influence of solar cells on global environment is significantly small, and hence it has been expected that solar cells become more widely used.

Among various materials which are used for forming solar cells, a large number of solar cells formed using silicon are commercially available, and the silicon solar cells can be categorized roughly into crystal silicon solar cells made of single crystal silicon or polycrystal silicon and non-crystal (amorphous) silicon solar cells. Heretofore, for the solar cells, single crystal or polycrystal silicon has been widely used. Although the crystal silicon solar cells described above have a high conversion efficiency, which represents the performance of converting light (sunlight) energy into electric energy, as compared to that of amorphous silicon, since a large amount of energy and a long period of time are required for the crystal growth, the productivity is low, and hence the crystal silicon has been disadvantageous in view of cost.

On the other hand, amorphous silicon solar cells have a low conversion efficiency as compared to that of crystal silicon solar cells; however, since light absorption is higher than that of crystal silicon solar cells, various advantages are obtained. That is, for example, various types of substrates may be freely selected, and a larger cell area can be easily achieved. In addition, the productivity of amorphous silicon solar cells is high as compared to that of crystal silicon solar cells. However, since vacuum processes must be performed for the production, production facility-related cost has been still a serious problem.

Accordingly, in order to further reduce the cost, various solar cells made of organic materials instead of silicon-bases materials have been investigated. However, when organic materials as described above are used for this purpose, the conversion efficiency is very low, such as 1% or less, and in addition, the durability is also another problem. Among various investigations, an inexpensive solar cell using a porous semiconductor particles sensitized by a dye has been disclosed in Nature (353, pp. 737-740, 1991). This solar cell is a wet type solar cell, that is, an electrochemical photocell, in which a porous thin film made of titanium oxide is used as a photoelectrode, the porous thin film being spectral-sensitized using a ruthenium complex as a sensitizing dye. The advantages of this solar cell are that an inexpensive oxide semiconductor such as titanium oxide can be used, light absorption of the sensitizing dye can be performed in a wide visible wavelength region of up to 800 nm, the incident photon-to-current efficiency is high, and high energy conversion efficiency can be realized. In addition, since vacuum processes are not required, a large production facility and the like are not necessary.

However, since the electrochemical photocell as described above is a wet type cell, there have been problems such as degradation in properties due to leakage and evaporation of an electrolyte solution, and hence the reliability of this type of photocell may not be always satisfactory. In order to overcome the problems described above, a gel electrolyte composed of a polymer such as polyethylene oxide (PEO) impregnated with an electrolyte solution has also been proposed. However, since the viscosity of the electrolyte is high, and nanoscale oxide semiconductor particles are used for electrodes, the electrode pores are not easily filled with the electrolyte, and as a result, a problem of decrease in solar-energy conversion efficiency may arise due to insufficient conducive properties. In addition, since cross-linking of the above gel electrolyte is primarily performed by the use of relatively weak secondary interaction such as intermolecular forces between polymer chains so as to form the gel, when heat is applied thereto, a problem may also arise in that the gel is easily changed into a liquid form. Furthermore, in film formation, since a coating step and a step of removing a solvent having a low boiling point and a low viscosity must be performed, the productivity is disadvantageously degraded.

Hence, investigation of a chemical cross-linking type gel electrolyte has drawn a lot of attention in which a polyfunctional monomer is dissolved in an electrolyte solution and is then polymerized by applying exterior energy such as heat or active rays. The feature of this gel electrolyte is that since the viscosity of a solution containing the monomer before polymerization and a plasticizer is low, the electrode pores are easily filled with the electrolyte solution. In addition, when a monomer solution formed by dissolving the polyfunctional monomer in the electrolyte solution is injected into a device assembled beforehand and is then in situ gelled, a photovoltaic device can be obtained which has superior chemical bonding at an electrode interface and superior conductive properties. Furthermore, by using an ionic liquid, that is, a molten salt, instead of an electrolyte solution using a solvent, a gel electrolyte having no vapor pressure can also be realized.

However, since iodine functions as a polymerization inhibitor in a general radical polymerization method, when an electrolyte solution contains iodine redox as an electron transport carrier, a problem may arise in that gelation cannot be in situ performed.

In addition, even when the iodine redox is not contained as an electron transport carrier, degradation of a sensitizing dye and an electrolyte layer inevitably occurs by application of heat and active rays in polymerization, and hence the photoelectric conversion properties are disadvantageously degraded.

Hence, in consideration of the conventional problems described above, the present invention was made, and an object of the present invention is to provide a solid electrolyte having superior conductive properties and reliability, a photovoltaic device using the solid electrolyte described above, and manufacturing methods thereof.

DISCLOSURE OF INVENTION

Accordingly, the present invention was made to solve the problems described above by a novel polymerization method instead of a radical polymerization method.

That is, a solid electrolyte of the present invention which achieves the above object is a solid electrolyte comprising an electrolyte composition and a matrix polymer which is formed by polymerization of a first compound having at least two isocyanate groups and a second compound having at least two nucleophilic groups containing active hydrogen in accordance with a polyaddition reaction, and the polymerization is performed after a precursor for the matrix polymer is brought into contact with a surface on which the solid electrolyte is to be formed.

In addition, another solid electrolyte of the present invention which achieves the above object is a solid electrolyte comprising an electrolyte composition and a matrix polymer which is formed by polymerization of a first compound having at least two unsaturated double bonds and a second compound having at least two nucleophilic groups containing active hydrogen in accordance with the Michael addition reaction, and the polymerization is performed after a precursor for the matrix polymer is brought into contact with a surface on which the solid electrolyte is to be formed.

In addition, when used as a solid electrolyte for photovoltaic devices, the solid electrolyte of the present invention is preferably used for a photovoltaic device having a redox couple formed in combination of a halogen ion and a halide ion, and in the case described above, the solid electrolyte of the present invention is particularly preferably used for a photovoltaic device in which iodine is used as the halogen element.

A photovoltaic device of the present invention, which achieves the above object, is a photovoltaic device comprising a semiconductor layer composed of semiconductor particles carrying a dye and an electrolyte layer, the layers being provided between an electrode provided on a surface of a transparent substrates and a counter electrode. The electrolyte layer has a redox couple, an electrolyte composition, and a matrix polymer, and the matrix polymer is formed by polymerization of a first compound having at least two isocyanate groups and a second compound having at least two nucleophilic groups containing active hydrogen in accordance with a polyaddition reaction. The polymerization is performed after a precursor for the matrix polymer is brought into contact with a surface on which the solid electrolyte is to be formed.

In addition, another photovoltaic device of the present invention, which achieves the above object, is a photovoltaic device comprising a semiconductor layer composed of semiconductor particles carrying a dye and an electrolyte layer, the layers being provided between an electrode provided on a surface of a transparent substrates and a counter electrode. The electrolyte layer has a redox couple, an electrolyte composition, and a matrix polymer, and the matrix polymer is formed by polymerization of a first compound having at least two unsaturated double bonds and a second compound having at least two nucleophilic groups containing active hydrogen in accordance with the Michael addition reaction. The polymerization is performed after a precursor for the matrix polymer is brought into contact with a surface on which the solid electrolyte is to be formed.

In addition, the above photovoltaic device of the present invention is preferably used when the redox couple described above is formed in combination of a halogen ion and a halide ion, and in this case, as the halogen element, iodine is particularly preferable.

A method for preparing a photovoltaic device, according to the present invention, which achieves the above object, is a method for preparing a photovoltaic device which has a semiconductor layer composed of semiconductor particles carrying a dye and an electrolyte layer, the layers being provided between an electrode formed on a surface of a transparent substrate and a counter electrode. The method described above comprises the steps of, after the photovoltaic device is assembled, injecting a mixed solution into the photovoltaic device, the mixed solution including a first compound having at least two isocyanate groups, a second compound having at least two nucleophilic groups containing active hydrogen, and an electrolyte composition which contains a redox couple; and polymerizing the first compound and the second compound into a solid form in the photovoltaic device by a polyaddition reaction so that the electrolyte layer is formed.

In addition, another method for preparing a photovoltaic device, according to the present invention, which achieves the above object, is a method for preparing a photovoltaic device which has a semiconductor layer composed of semiconductor particles carrying a dye and an electrolyte layer, the layers being provided between an electrode formed on a surface of a transparent substrate and a counter electrode. The method described above comprises the steps of, after the photovoltaic device is assembled, injecting a mixed solution into the photovoltaic device, the mixed solution including a first compound having at least two unsaturated double bonds, a second compound having at least two nucleophilic groups containing active hydrogen, and an electrolyte composition which contains a redox couple; and polymerizing the first compound and the second compound into a solid form in the photovoltaic device by the Michael addition reaction so that the electrolyte layer is formed.

According to the methods for preparing a photovoltaic device, of the present invention, the photovoltaic devices described above can be efficiently and reliably formed.

BEST MODE FOR CARRYING OUT THE INVENTION

Hereinafter, a solid electrolyte of the present invention, a photovoltaic device using this solid electrolyte, and manufacturing methods thereof will be described in detail. However, the present invention is not limited to the following descriptions, and modification may be optionally made without departing from the spirit and the scope of the present invention.

The solid electrolyte of the present invention is a solid electrolyte having an electrolyte composition and a matrix polymer. In this solid electrolyte, the matrix polymer is formed by polymerization of a first compound having at least two isocyanate groups and a second compound having at least two nucleophilic groups containing active hydrogen in accordance with a polyaddition reaction, and the polymerization is performed after a precursor for the matrix polymer is brought into contact with a surface on which the solid electrolyte is to be formed.

Figure 1:
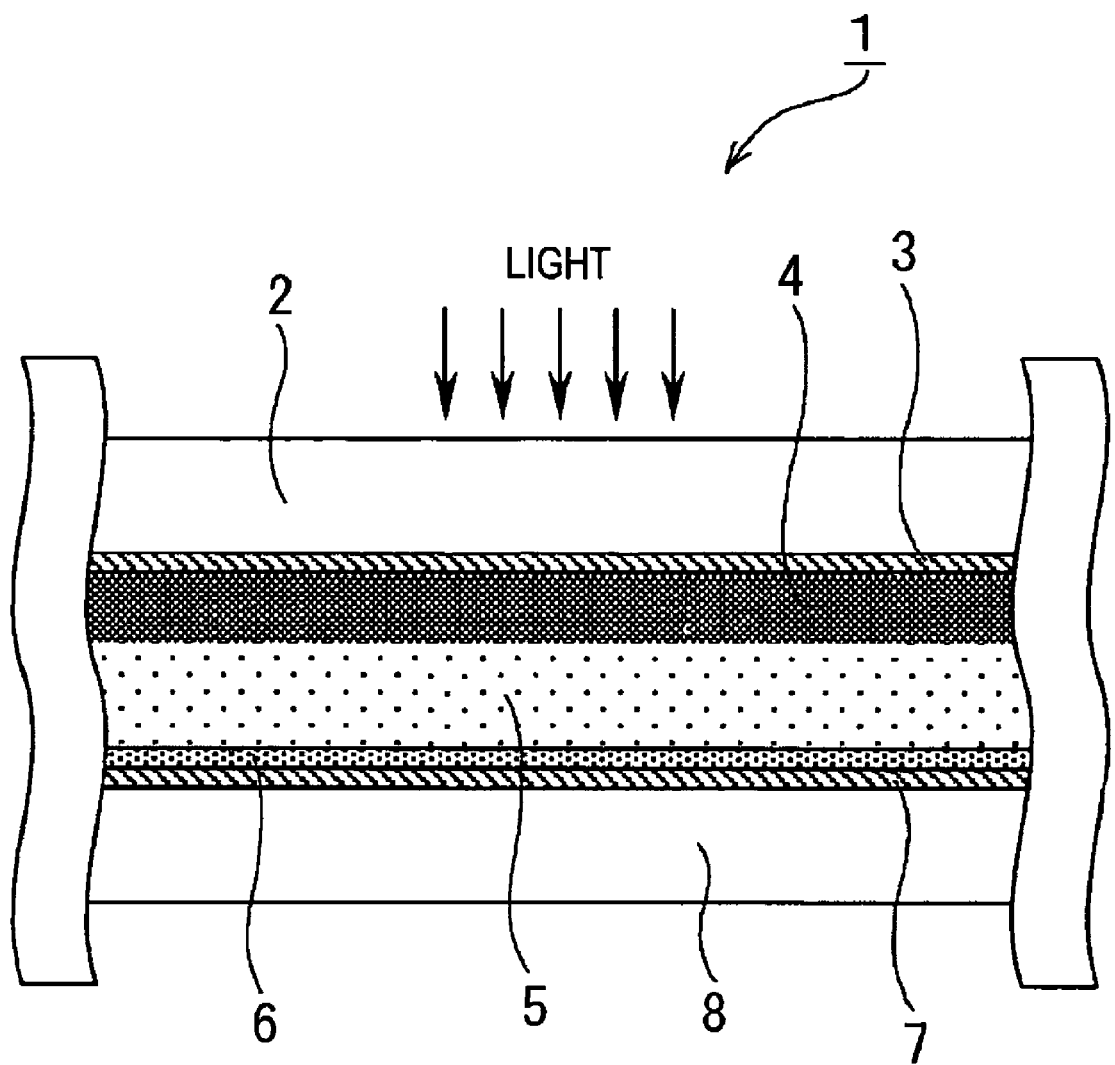
FIG. 1 is a cross-sectional view showing one structural example of a dye-sensitized solar cell formed in accordance with the present invention.

FIG. 1 is a cross-sectional view showing the structure of a dye-sensitized solar cell which is a photovoltaic device formed in accordance with the present invention described above. As shown in FIG. 1, a dye-sensitized solar cell 1 is formed of a transparent substrate 2, a transparent electrode 3, a semiconductor layer 4, a solid electrolyte 5, a platinum layer 6 processed by platinum chloride treatment, a transparent electrode 7, and a transparent substrate 8.

Materials for the transparent substrates 2 and 8 are not particularly limited as long as having transparency, and for example, a glass substrate may be used.

The transparent electrodes 3 and 7 are electrodes formed using a transparent material and provided under the transparent substrate 2. As materials for the electrodes, any materials may be used as long as having conductivity and transparency; however, since simultaneously having superior conductivity, transparency, and heat resistance, tin-based oxides and the like are preferably used, and in addition, ITO is preferable in view of cost. In addition, the transparent electrode 7 is not always necessary to be provided and may be formed whenever necessary.

The semiconductor layer 4 is formed on the transparent electrode 3 by sintering semiconductor particles carrying a dye, and the dye absorbs light which passes through the transparent substrate 2 and the transparent electrode 3 and is then incident on the semiconductor layer 4. The semiconductor particles are semiconductor fine particles carrying a dye, and as the semiconductor fine particles, besides elemental semiconductor represented by silicon, compound semiconductors, compounds having a perovskite structure, and the like may also be used. As the semiconductor described above, an n-type semiconductor is preferable in which conduction band electrons serve as carriers under photoexcitation conditions to convey an anode current. In particular, for example, there may be mentioned $TiO_2$ (titania), $SnO_2$, $ZnO$, $WO_3$, $Nb_2O_5$, and $TiSrO_3$, and anatase $TiO_2$ is particularly preferable. In addition, the types of semiconductors are not limited to those mentioned above, and the aforementioned materials may be used alone or in combination.

A film-forming method of the semiconductor layer 4 is not particularly limited; however, in consideration of properties, handiness, manufacturing cost, and the like, a wet film-forming method is preferably used for semiconductor fine particles, and a method is preferably used having the steps of preparing a paste in which semiconductor fine particles in a powdered form or a sol form are uniformly dispersed in a solvent such as water, and applying the paste onto a substrate provided with a transparent conductive film thereon. An application method is not particularly limited, and application may be performed using various known methods. As the known methods, for example, there may be mentioned dipping, spraying, wire-bar coating, spin coating, roller coating, blade coating, and gravure coating, and in addition, as wet printing methods, for example, relief printing, off-set printing, gravure printing, intaglio printing, rubber plate printing, and screen printing may be mentioned.

As the crystal structure of crystal titanium oxide, an anatase structure is preferable in view of photocatalytic activity. As the anatase titanium oxide, a commercial available powder, sol, and slurry may be used, and alternatively, a titanium oxide having a predetermined particle size may be formed by a known method in which, for example, a titanium oxide alkoxide is hydrolyzed. When a commercial available powder is used, secondary aggregation of the particles is preferably resolved, and hence the particles are preferably pulverized by the use of a mortar, a ball mill, or the like when a coating solution is prepared. In this step, in order to prevent re-aggregation of the particles which were processed once for resolving the secondary aggregation, acetyl acetone, hydrochloric acid, nitric acid, a surfactant, a chelating agent, or the like may be added. In addition, in order to increase viscosity, various thickening agents may be used, and for example, a polymer such as polyethylene oxide or polyvinyl alcohol, or a cellulose-based thickening agent may be mentioned.

Although the particle diameter of the semiconductor fine particles is not particularly limited, the average particle diameter of the primary particles is preferably in the range of from 1 to 200 nm and particularly preferably in the range of from 5 to 100 nm. In addition, at least two types of particles having a size larger than that of the above semiconductor fine particles may be mixed together for scattering incident light, so that the quantum yield can be improved. In this case, the average particle size of the particles which are additionally mixed is preferably in the range of from 20 to 500 nm.

The semiconductor layer preferably has a large surface area so that a large amount of dyes are adsorbed thereon. Hence, the surface area obtained when the semiconductor fine particles are applied onto a supporting body is preferably 10 times or more the projection area thereof and is more preferably 100 times or more. The upper limit of this surface area is not particularly specified; however, in general, the surface area is approximately 1,000 times the projection area. In general, when the thickness of a layer containing semiconductor fine particles is increased, the light-capturing rate is increased since the dye amount carried per unit projection area is increased; however, since the diffusion length of injected electrons is also increased, a loss caused by charge recombination is also increased. Hence, the semiconductor layer has a preferable thickness; however, the thickness is generally in the range of from 0.1 to 100 μm, is more preferably in the range of from 1 to 50 μm, and is particularly preferably in the range of from 3 to 30 μm.

After the semiconductor fine particles are applied onto the supporting body, in order to improve the film strength and the adhesion with the substrate, firing is preferably performed so that the semiconductor fine particles are electronically brought into contact with each other. The firing temperature is not particularly limited; however, when the temperature is excessively increased, the resistance of the substrate may be increased so that it is melted in some cases, and hence the temperature is generally in the range of from 40 to 700° C. and is more preferably in the range of from 40 to 650° C. In addition, the firing time is also not particularly limited; however, it is generally in the range of approximately 10 minutes to 10 hours. After firing, in order to increase the surface area of the semiconductor particles, to remove impurities of the semiconductor layer, and to improve the electron injection efficiency from the dye into the semiconductor particles, for example, chemical plating using an aqueous solution containing tetrachloride titanium or electrochemical plating treatment using an aqueous solution containing trichloride titanium may be performed.

As the dye adsorbed onto the semiconductor fine particles, for example, a ruthenium-based dye is preferably used. However, the dye adsorbed onto the semiconductor fine particles is not particularly limited as long as having a charge separation function and a sensitizing effect. Hence, besides the ruthenium-based dye, for example, there may be mentioned xanthene dyes such as rhodamine B, rose bengal, eosine, and erythrosine; cyanine dyes such as quinocyanine and cryptocyanine; basic dyes such as phenosafranine, capri blue, thionine, and methylene blue; porphyrin compounds such as chlorophyll, zinc porphyrin, and magnesium porphyrin; complex compounds such as azo dyes, phthalocyanine compounds, and Ru trisbipyridyl; anthraquinone dyes; and polycyclic quinone dyes. The dyes mentioned above may be used alone or in combination.

A method for adsorbing the above dye onto the semiconductor layer is not particularly limited; however, after the dye is dissolved in a solvent, such as alcohol, nitrile, nitromethahne, halogenated hydrocarbon, ether, dimethyl sulfoxide, amide, N-methyl pyrrolidone, 1,3-dimethyl imidazolidinone, 3-methyl oxazolidinone, ester, carbonic acid ester, ketone, hydrocarbon, or water to form a dye solution, an electrode having a semiconductor layer may be immersed in this dye solution, or this dye solution may be applied onto a semiconductor layer. In addition, in order to reduce the association between dye elements, deoxycholic acid, chenodeoxycholic acid, or the like may be added. In addition, a UV absorber may also be used.

In addition, in order to facilitate removal of an excessively adsorbed dye, after the dye is adsorbed, the surfaces of the semiconductor fine particles may be processed using an amine. As the amine, for example, there may be mentioned pyridine, 4-tert-butylpyridine, or polyvinylpyridine. When being in the liquid form, the amine mentioned above may be used as it is or may be dissolved in an organic solvent.

The solid electrolyte 5 is formed of angel electrolyte or an entire solid electrolyte, which functions as a carrier transport layer, and is formed by polymerization of a first compound having at least two isocyanate groups and a second compound having at least two nucleophilic groups containing active hydrogen in accordance with the polyaddition reaction to form a polymer material having a cross-linking matrix. Accordingly, in this dye-sensitized solar cell, when the solid electrolyte 5 formed of a gel electrolyte or an entire solid electrolyte is used for the electrolyte layer, the decrease of the electrolyte layer due to leakage and evaporation of liquid can be prevented, which occurs when an electrolyte solution is used, and hence a dye-sensitized solar cell having superior cell properties and reliability can be realized.

One of the first compound and the second compound preferably has ether, ester, carbonate, alkyl, perfluorocarbon, nitrile, tertiary amine, or the like at the main and the side chains. The number of the isocyanate groups of the first compound is preferably at least two; however, when the number of the nucleophilic groups containing active hydrogen of the second compound is two, the number of the isocyanate groups of the first compound must be at least three. As is the case described above, the number of the nucleophilic groups containing active hydrogen of the second compound is preferably at least two; however, when the number of the isocyanate groups of the first compound is two, the number of the nucleophilic groups containing active hydrogen of the second compound must be at least three.

In addition, compounds having different structures may be used alone or in combination. As the first compound, for example, tolylene 2,4-diisocyanate, 4,4'-diphenylmethane diisocyanate, hexamethylene diisocyanate, isophorone diisocyanate, hydrogenated 4,4'-diphenylmethane diisocyanate, a trimer of hexamethylene diisocyanate, or a polymer of isocyanate ethylmethacrylate may be mentioned by way of example. In order to improve light resistance, as the first compound, aliphatic isocyanate compounds are preferably selected and may be used alone or in combination.

In addition, as the second compound, for example, there may be mentioned a polyol compound, such as diol, triol, or tetraol; a polyamine compound such as diamine, triamine, or tetramine as is the case described above; or a polycarboxylic acid such as dicarboxylic acid, tricarboxylic acid, or teracarboxylic acid. The compound mentioned above may be used alone or in combination.

In addition, in order to efficiently carry out the polyaddition reaction, a catalyst may be used. As the catalyst, a known catalyst used for polyurethane synthesis may be mentioned, such as a tin-based catalyst including dibutyl tin dilaurate or an amine-based catalyst; however, the catalyst is not specifically limited to those mentioned above, and the catalysts mentioned above may be used alone or in combination. In addition, when the catalyst is used, the content thereof is 1 percent by weight or less and is preferably 0.1 percent by weight or less.

When the solid electrolyte 5 is a gel electrolyte, the gel electrolyte is composed of an electrolyte composition containing a solvent and the above cross-linking matrix, and the cross-linking matrix occupies 3 to 50 percent by weight of the gel electrolyte. As the solvent forming the electrolyte composition, for example, there may be mentioned water, alcohol, ether, ester, carbonic acid ester, lactone, carboxylic acid ester, phosphate triester, heterocyclic compound, nitrile, ketone, amide, nitormethane, halogenated hydrocarbon, dimethyl sulfoxide, sulfolane, N-methyl pyrrolidone, 1,3-dimethyl imidazolidinone, 3-methyl oxazolidinone, or hydrocarbon. However, the solvent is not limited to those mentioned above, and the aforementioned solvents may be used alone or in combination. In addition, among the solvents mentioned above, aprotic nonaqueous solvents are more preferable.

When the ratio of the electrolyte composition to the gel electrolyte is increased, the ion conductivity is increased, and on the other hand, the mechanical strength is decreased. On the contrary, as the ratio of the electrolyte composition to the gel electrolyte 5 is decreased, the mechanical strength is increased, but the ion conductivity is decreased. Hence, the electrolyte composition preferably occupies 50 to 97 percent by weight of the gel electrolyte and more preferably occupies 80 to 95 percent by weight thereof.

As the electrolytes used for the gel electrolyte, in addition to the combination of $I_2$ and a metal iodide or an organic iodide and the combination of $Br_2$ and a metal bromide or an organic bromide, for example, metal complexes such as ferrocyanate/ferricyanate and ferrocene/ferricinium ion; sulfur compounds, such as sodium polysulfide and alkylthiol/alkyldisulfide; viologne dyes; and hydroquinone/quinone may be used.

As cations of the above metal compounds, Li, Na, K, Mg, Ca, Cs, and the like are preferable, and as cations of the above organic compounds, quaternary ammonium compounds, such as tetraalkylammonium, pyridinium, and imidazolium, are preferable. However, the cations are not limited to those mentioned above, and the above materials may be used alone or in combination. Among those mentioned above, the combination of $I_2$ and LiI or a quaternary ammonium compound such as imidazolium iodide is preferably used as the electrolyte. The concentration of the electrolyte salt is preferably 0.05 to 5 M to the solvent and is more preferably 0.2 to 1 M. The concentration of $I_2$ or $Br_2$ is preferably 0.0005 to 1 M and is more preferably 0.001 to 0.1 M. In addition, in order to improve an open-circuit voltage and a short-circuit current, various additives such as 4-tert-butylpyridine and a carboxylic acid may also be added.

In addition, when the solid electrolyte 5 is an entire solid electrolyte, the entire solid electrolyte is formed, for example, of the cross-linking matrix containing iodine redox. As the electrolytes, in addition to the combination of $I_2$ and a metal iodide or an organic iodide and the combination of $Br_2$ and a metal bromide or an organic bromide, for example, metal complexes such as ferrocyanate/ferricyanate and ferrocene/ferricinium ion; sulfur compounds, such as sodium polysulfide and alkylthiol/alkyldisulfide; viologne dyes; and hydroquinone/quinone may be used.

As cations of the above metal compounds, Li, Na, K, Mg, Ca, Cs, and the like are preferable, and as cations of the above organic compounds, quaternary ammonium compounds, such as tetraalkylammonium, pyridinium, and imidazolium, are preferable. However, the cations are not limited to those mentioned above, and the above materials may be used alone or in combination. Among those mentioned above, the combination of $I_2$ and LiI or a quaternary ammonium compound such as imidazolium iodide is preferably used as the electrolyte. The concentration of the electrolyte salt is preferably 0.05 to 5 M to the monomer and is more preferably 0.2 to 1 M. In addition, the concentration of $I_2$ or $Br_2$ is preferably 0.0005 to 1 M and is more preferably 0.001 to 0.1 M.

Since the solid electrolyte 5 having the structure as described above is formed of a gel electrolyte or an entire solid electrolyte, degradation in properties due to leakage and evaporation of an electrolyte solution does not occur, thereby realizing a highly reliable electrolyte.

In addition, since being a polymer formed by the polyaddition reaction between the above first and second compounds and having a cross-linking structure, the matrix polymer of the solid electrolyte 5 is not changed into a liquid form by heating, and hence superior mechanical properties and durability can be obtained.

In addition, since a precursor for this solid electrolyte 5, which is in a state before polymerization and which has fluidity, is brought into contact with a surface on which the solid electrolyte is to be formed, that is, with an electrode surface, followed by polymerization, the pores of the electrode surface are sufficiently filled with the electrolyte, and the chemical bonding condition at the electrochemical interface between the solid electrolyte and the electrode surface is improved, thereby obtaining superior conductive properties.

In addition, since this solid electrolyte 5 is formed by polymerizing the above first and second compounds in accordance with the polyaddition reaction, the use of heat and active rays is not necessary in polymerization. Accordingly, the electrolyte composition is not degraded by the use of heat and active rays in production, and hence an electrolyte having superior conductive properties can be realized. In addition, the manufacturing process is simple, and the productivity is superior.

In addition, since this solid electrolyte is formed by the polyaddition reaction and is not formed by radical polymerization, even when iodine which functions as a polymerization inhibitor in a radical polymerization method is contained in the electrolyte composition, the solid electrolyte can be easily formed, and in addition, since being in situ formed in a cell device, the solid electrolyte is preferably applied to a photovoltaic device or the like which uses an iodine redox couple.

The platinum layer 6 is a counter electrode formed of any optional material as long as it has conductive properties. In addition, even in the case in which an insulating material is used, when having a conductive layer at a side facing a semiconductor electrode, the insulating material may also be used. However, an electrochemically stable material is preferably used, and in particular, platinum, gold, carbon, or the like is preferably used. In addition, in order to improve a catalytic effect of oxidation-reduction, the surface at a side facing the semiconductor electrode preferably has an increased surface area. For example, platinum in a platinum black state or carbon having a porous structure is preferably used. The platinum in a platinum black state may be obtained by anodization or treatment using a chloroplatinic acid solution, and the carbon having a porous structure may be formed by firing carbon fine particles or an organic polymer.

The dye-sensitized solar cell 1 having the structure as described above is operated as described below. Light incident on the transparent electrode 2 at the transparent electrode 3 side excites the dye carried on the surface of the semiconductor layer 4, and the dye smoothly transports electrons to the semiconductor fine particles of the semiconductor layer 4. In addition, the dye which lost electrons receives electrons from ions of the gel electrolyte 5. Molecules which transported electrons again receive electrons at the platinum layer 6 which is the counter electrode.

In addition, the above dye-sensitized solar cell 1 can be formed as described below. Hereinafter, the case in which a gel electrolyte is used as the solid electrolyte 5 will be described by way of example.

First, on one major surface of the transparent substrate 2, the transparent electrode 3 is formed, and on the transparent electrode 3, the semiconductor layer 4 carrying the dye is formed, thereby forming the semiconductor electrode. In addition, on one major surface of the transparent substrate 8, the transparent electrode 7 is formed, and on the transparent electrode 7, the platinum layer 6 treated using platinum chloride is formed. Subsequently, after the semiconductor layer 4 carrying the dye and the platinum layer 6 are disposed to face each other, side surfaces of the transparent substrate 2 and the transparent substrate 7 are sealed so that the semiconductor electrode and the counter electrode are not brought into contact with each other. In this step, the distance between the semiconductor electrode and the counter electrode is not particularly limited; however, the distance is generally 1 to 100 µm and is more preferably 1 to 30 µm. When this distance is excessively large, the conductivity is decreased, and as a result, the amount of photocurrent is unfavorably decreased.

In addition, although the sealing method is not specifically limited, a material having light resistance, insulating properties, and humidity resistance is preferably used, and for example, an epoxy resin, a UV curable resin, an acrylic adhesive, ethylene vinyl acetate (EVA), a ceramic, or a heat sealable film may be used. In addition, the photovoltaic device of the present invention must have an inlet opening through which a solution before gelation is injected. The place of the inlet opening is not particularly limited except locations at which the semiconductor layer 4 carrying the dye and part of the counter electrode, which faces the semiconductor layer 4, are present, and hence the inlet opening may be provided at an optional place.

Next, a mixed solution is prepared which serves as the precursor for the gel electrolyte 5. First, the second compound having at least two nucleophilic groups containing active hydrogen is dissolved in an electrolyte solution which is the electrolyte composition. Subsequently, the first compound having at least two isocyanate groups is dissolved, thereby preparing the mixed solution before gelation. In this process, the order of the dissolution of the compounds is not particularly limited; however the isocyanate groups are likely to react with iodine in the electrolyte composition, the compounds are preferably dissolved in that order described above.

The mixed solution is injected into the dye-sensitized solar cell 1 assembled as described above. The method for injecting the mixed solution is not specifically limited; however, a method is preferably performed in which after the compounds are thoroughly dissolved, the mixed solution is injected inside the dye-sensitized solar cell 1 which is sealed beforehand and which is provided with the inlet opening for the mixed solution. In this case, a method can be easily performed in which after several droplets of the mixed solution are dripped in the inlet opening, the mixed solution is injected using a capillary phenomenon. In addition, whenever necessary, the injection of the mixed solution may be performed at a reduced pressure. After the mixed solution is entirely injected, the mixed solution remaining at the inlet opening is removed, and this inlet opening is then sealed. This sealing method is also not particularly limited, and whenever necessary, sealing may be performed by bonding a glass plate to the inlet opening with a sealing agent.

After injected into the dye-sensitized solar cell 1, the mixed solution before gelation is preferably allowed to stand until the polymerization of the first compound having at least two isocyanate groups and the second compound having at least two nucleophilic groups containing active hydrogen is completed by the polyaddition reaction. The standing time is not particularly limited; however, the time in which the mixed solution injected inside the dye-sensitized solar cell 1 completely loses its viscosity and the gelation is completed is in the range of approximately 1 minute to 48 hours. However, the time described above may vary in some cases in accordance with various conditions, that is, in accordance with the selections of the first and the second compounds, the electrolyte, the solvent, and the like. In addition, the ambient temperature of the standing atmosphere is not particularly limited; however, it is generally in the range of from 0 to 120° C. and is preferably in the range of from 0 to 80° C. for reducing the influence on the dye and the electrolyte.

In addition, in the dye-sensitized solar cell 1, in order to increase power generation efficiency, the surface of the transparent substrate 2 at the side on which light is incident may be processed by antireflection (AR) treatment. In addition, by processing the surface of the dye-sensitized solar cell 1 by grooving, texturing, or the like, the efficiency of the use of incident light may be increased. In addition, in order to effectively use light passing through the dye-sensitized solar cell 1, the bottom layer of the counter electrode may be provided with a metal, such as Al or Ag, or an alloy thereof having a high reflectance by sputtering or deposition.

As described above, the dye-sensitized solar cell 1 can be formed.

In the dye-sensitized solar cell 1 thus formed, since the solid electrolyte 5 described above is provided, degradation in properties due to leakage and evaporation of an electrolyte solution does not occur, and hence a dye-sensitized solar cell having superior reliability can be realized.

In addition, in this dye-sensitized solar cell 1, since the matrix polymer of the solid electrolyte 5 is a polymer formed of the above first and second compounds by the polyaddition reaction and has a chemically cross-linking structure, the solid electrolyte 5 is not changed into a liquid form by heating, and hence a dye-sensitized solar cell having superior mechanical properties and durability can be realized.

In addition, in the case in which a solid electrolyte is used for a dye-sensitized solar cell, when the solid electrolyte is formed beforehand and is then provided so as to be in close contact with a semiconductor layer for forming the dye-sensitized solar cell, since the semiconductor layer and the solid electrolyte each having its own shape, that is, each having a solidified surface shape, are brought into contact with each other, adhesion between the semiconductor layer and the solid electrolyte is not satisfactory. As a result, due to the insufficient contact between the semiconductor layer and the solid electrolyte, a problem may arise in that the solar-energy conversion efficiency is decreased.

However, in this dye-sensitized solar cell 1, since the precursor for the solid electrolyte 5, which is in a state before polymerization and which has fluidity, is injected into the dye-sensitized solar cell, followed by polymerization, the pores of the electrode surface are sufficiently filled with the electrolyte, and in addition, the adhesion of the solid electrolyte 5 with the semiconductor fine particles of the semiconductor layer 4 and the platinum layer 6 used as the counter electrode can be increased. Accordingly, since the contact between the semiconductor layer 4 and the solid electrolyte 5 can be satisfactorily secured, the chemical bonding condition at the electrochemical interface between the solid electrolyte 5 and the electrode surface is improved, thereby realizing a dye-sensitized solar cell having superior photoelectric conversion properties.

In addition, in this dye-sensitized solar cell 1, since the solid electrolyte 5 is formed by polymerization in accordance with the polyaddition reaction, the use of heat and active rays is not necessary. Accordingly, the electrolyte composition is not degraded by the use of heat and active rays in production of the solid electrolyte, and hence a photovoltaic device having superior photoelectric conversion properties can be realized. In addition, the manufacturing process is simple, and the productivity is superior.

In addition, in this dye-sensitized solar cell 1, since this solid electrolyte 5 is formed by the polyaddition reaction and is not formed by radical polymerization, even when iodine which functions as a polymerization inhibitor in a radical polymerization method is contained in the electrolyte composition, the solid electrolyte 5 can be easily formed, and in addition, the solid electrolyte 5 can be in situ formed in a cell device. Hence, according to this dye-sensitized solar cell 1, a dye-sensitized solar cell having superior photoelectric conversion properties can be easily and reliably formed.

In the solid electrolyte 5 described above, by using an ionic liquid, that is, a molten salt, instead of the electrolyte composition containing a solvent, a gel electrolyte having no vapor pressure can also be realized.

Figure 2:
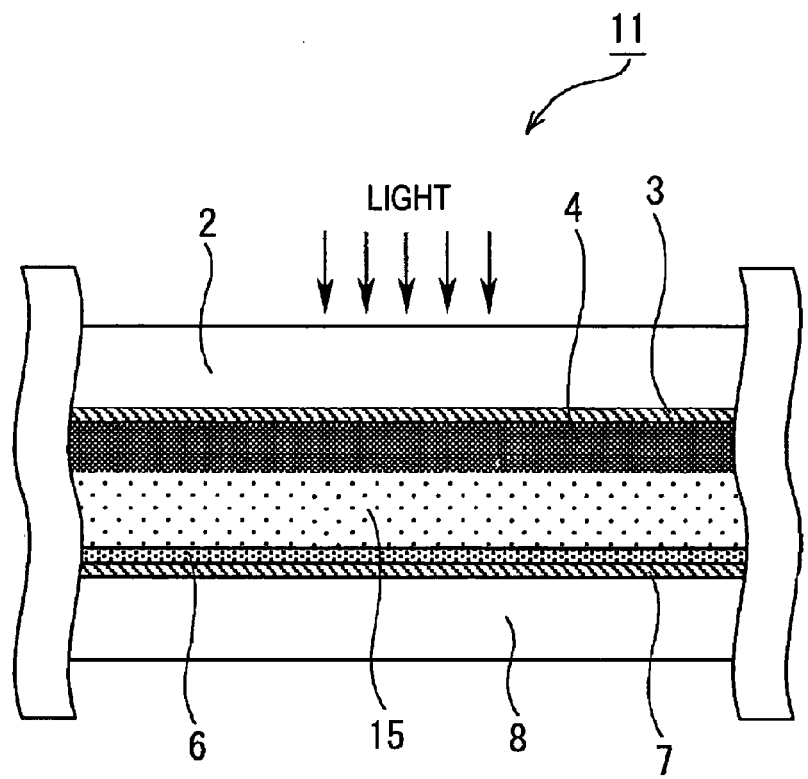
FIG. 2 is a cross-sectional view showing another structural example of a dye-sensitized solar cell formed in accordance with the present invention.

Next, another solid electrolyte and photovoltaic device, according to the present invention, and manufacturing methods thereof will be described in detail. FIG. 2 is a cross-sectional view showing the structure of another dye-sensitized solar cell formed in accordance with the present invention. As shown in FIG. 2, a dye-sensitized solar cell 11 is formed of the transparent substrate 2, the transparent electrode 3, the semiconductor layer 4, a solid electrolyte 15, the platinum layer 6 treated by platinum chloride, the transparent electrode 7, and the transparent substrate 8. In this dye-sensitized solar cell 11, the same reference numerals of the constituent elements of the above dye-sensitized solar cell 1 shown in FIG. 1 designate the same constituent elements, and descriptions thereof in detail will be omitted. A difference between the dye-sensitized solar cell 11 and the dye-sensitized solar cell 1, that is, in more particular, the solid electrolyte 15 will only be described.

The solid electrolyte 15 is formed of a gel electrolyte which functions as a carrier transport layer, and is a polymer material having a cross-linking matrix formed by polymerization of a first compound having at least two isocyanate groups and a second compound having at least two nucleophilic groups containing active hydrogen in accordance with the polyaddition reaction. In addition, the solid electrolyte 15 is formed of an ionic liquid containing a redox couple and 3 to 50 percent by weight of the cross-linking matrix described above. Accordingly, in this dye-sensitized solar cell, when the solid electrolyte 15 formed of the gel electrolyte is used as the electrolyte layer, the decrease of the electrolyte layer due to leakage and evaporation of liquid can be prevented, which occurs when an electrolyte solution is used, and hence a dye-sensitized solar cell having superior cell properties and reliability can be realized.

In this solid electrolyte described above, one of the first compound and the second compound preferably has ether, ester, carbonate, alkyl, perfluorocarbon, nitrile, tertiary amine, or the like at the main and the side chains. The number of the isocyanate groups of the first compound is preferably at least two; however, when the number of the nucleophilic groups containing active hydrogen of the second compound is two, the number of the isocyanate groups of the first compound must be at least three. As is the case described above, the number of the nucleophilic groups containing active hydrogen of the second compound is preferably at least two; however, when the number of the isocyanate groups of the first compound is two, the number of the nucleophilic groups containing active hydrogen of the second compound must be at least three.

In addition, compounds having different structures may be used alone or in combination. As the first compound, for example, tolylene 2,4-diisocyanate, 4,4'-diphenylmethane diisocyanate, hexamethylene diisocyanate, isophorone diisocyanate, hydrogenated 4,4'-diphenylmethane diisocyanate, a trimer of hexamethylene diisocyanate, or a polymer of isocyanate ethylmethacrylate may be mentioned by way of example. In order to improve light resistance, as the first compound, aliphatic isocyanate compounds are preferably selected and may be used alone or in combination.

In addition, as the second compound, for example, there may be mentioned a polyol compound, such as diol, triol, or tetraol; a polyamine compound such as diamine, triamine, or tetramine as is the case described above; or a polycarboxylic acid such as dicarboxylic acid, tricarboxylic acid, or teracarboxylic acid. The compound mentioned above may be used alone or in combination.

In addition, in order to efficiently carry out the polyaddition reaction, a catalyst may be used. As the catalyst, a known catalyst used for polyurethane synthesis may be mentioned, such as a tin-based catalyst including dibutyl tin dilaurate or an amine-based catalyst; however, the catalyst is not specifically limited to those mentioned above, and the catalysts mentioned above may be used alone or in combination. In addition, when the catalyst is used, the content thereof is 1 percent by weight or less and is preferably 0.1 percent by weight or less.

As the ionic liquid, for example, there may be mentioned a pyridinium salt, an imidazolium salt, or a triazorium salt; however, the ionic liquid is not limited thereto. In addition, those mentioned above may be used alone or in combination. The melting point of the ionic liquid is preferably 100° C. or less, more preferably 80° C. or less, and particularly preferably 60° C. or less.

When the ratio of the ionic liquid to the gel electrolyte is increased, the ion conductivity is increased thereby, but the mechanical strength is decreased. On the other hand, as the ratio of the ionic liquid to the gel electrolyte is decreased, the mechanical strength is increased; however, the ion conductivity is decreased. Hence, the ionic liquid preferably occupies 50 to 97 percent by weight of the gel electrolyte and more preferably occupies 80 to 95 percent by weight thereof.

As the redox couple used for the gel electrolyte of the present invention, the combination of $I_2$ and an ionic liquid of iodide or the combination of $Br_2$ and an ionic liquid of bromide is preferable, and in particular, the combination of $I_2$ and the ionic liquid is preferable. The concentration of the redox species to the total electrolyte is preferably 0.1 to 20 percent by weight and is more preferably 0.2 to 5 percent by weight.

In addition, besides the materials mentioned above, as the anion forming the ionic liquid, for example, there may be mentioned a halogen ion such as $Cl^{-1}$ or $Br^{-1}$, $NSC^{-1}$, $BF_4^{-1}$, $PF_6^{-1}$, $ClO_4^{-1}$, $(CF_3SO_2)_2N^{-1}$, $(CF_3CF_2SO_2)_2N^{-1}$, $CF_3SO_3^{-1}$, $CF_3COO^{-1}$, $Ph_4B^{-1}$, $(CF_3SO_2)_3C^{-1}$, or $F(HF)_n$, and among those mentioned above, $(CF_3SO_2)_2N^{-1}$ or $BF_4^{-1}$ is preferable.

In addition, as the redox couples in this case, besides the combination with a metal iodide or an organic iodide and the combination of $Br_2$ and a metal bromide or an organic bromide, for example, metal complexes such as ferrocyanate/ferricyanate and ferrocene/ferricinium ion; sulfur compounds, such as sodium polysulfide and alkylthiol-alkyldisulfide; viologne dyes; and hydroquinone/quinone may be used.

As cations of the above metal compounds, Li, Na, K, Mg, Ca, Cs, and the like are preferable, and as cations of the above organic compounds, quaternary ammonium compounds, such as tetraalkylammonium, pyridinium, and imidazolium, are preferable. However, the cations are not limited to those mentioned above, and the above materials may be used alone or in combination. Among those mentioned above, an electrolyte formed in combination of $I_2$ and a quaternary ammonium compound such as imidazolium iodide is preferably used.

The concentration of the electrolyte salt is preferably 0.05 to 5 M with respect to the ionic liquid and is more preferably 0.2 to 1 M. The concentration of $I_2$ or $Br_2$ is preferably 0.0005 to 1 M and is more preferably 0.001 to 0.1 M. In addition, in order to improve the open-circuit voltage and short-circuit current, various additives such as 4-tert-butylpyridine and a carboxylic acid may also be added.

Since the solid electrolyte 15 having the structure as described above is formed of the gel electrolyte, degradation in properties due to leakage and evaporation of an electrolyte solution does not occur, and hence a highly reliable electrolyte is realized.

In addition, since being a polymer formed by the polyaddition reaction between the above first and the second compounds and having a chemically cross-linking structure, the matrix polymer of the solid electrolyte 15 is not changed into a liquid form by heating, and hence superior mechanical properties and durability can be obtained.

In addition, since a precursor for the solid electrolyte 15, which is in a state before polymerization and has fluidity, is brought into contact with a surface on which the solid electrolyte is to be formed, that is, with an electrode surface, followed by polymerization, the pores of the electrode surface are sufficiently filled with the electrolyte, and in addition, the chemical bonding condition at the electrochemical interface between the solid electrolyte and the electrode surface is improved, thereby obtaining superior conductive properties.

In addition, since the solid electrolyte 15 is formed by polymerizing the above first and second compounds in accordance with the polyaddition reaction, the use of heat and active rays is not necessary in polymerization. Accordingly, the electrolyte composition is not degraded by the use of heat and active rays in production, and hence an electrolyte having superior conductive properties can be realized. In addition, the manufacturing process is simple, and the productivity is superior.

In addition, since this solid electrolyte 15 is formed by the polyaddition reaction and is not formed by radical polymerization, even when iodine which functions as a polymerization inhibitor in a radical polymerization method is contained in the electrolyte composition, the solid electrolyte can be easily formed, and in addition, since being in situ formed in a cell device, the solid electrolyte is preferably applied to a photovoltaic device or the like which uses an iodine redox couple.

In addition, the dye-sensitized solar cell 11 described above can be formed as described below.

First, on one major surface of the transparent substrate 2, the transparent electrode 3 is formed, and on the transparent electrode 3, the semiconductor layer 4 carrying the dye is formed, thereby forming the semiconductor electrode. In addition, on one major surface of the transparent substrate 8, the transparent electrode 7 is formed, and on the transparent electrode 7, the platinum layer 6 treated using platinum chloride is formed. Subsequently, the semiconductor layer 4 carrying the dye and the platinum layer 6 are disposed to face each other, and side surfaces of the transparent substrate 2 and the transparent substrate 7 are sealed so that the semiconductor electrode and the counter electrode are not brought into contact with each other. In this step, the distance between the semiconductor electrode and the counter electrode is not particularly limited; however, the distance is generally 1 to 100 µm and is more preferably 1 to 30 µm. When this distance is excessively large, the conductivity is decreased, and as a result, the amount of photocurrent is unfavorably decreased.

In addition, although the sealing method is not specifically limited, a material having light resistance, insulating properties, and humidity resistance is preferably used, and for example, an epoxy resin, a UV curable resin, an acrylic adhesive, ethylene vinyl acetate (EVA), a ceramic, or a heat sealable film may be used. In addition, the photovoltaic device of the present invention must have an inlet opening through which a solution before gelation is injected. The place of the inlet opening is not particularly limited except locations at which the semiconductor layer 4 carrying the dye and part of the counter electrode, which faces the semiconductor layer 4, are present, and hence the inlet opening may be provided at an optional place.

Next, a mixed solution is prepared which serves as the precursor for the gel electrolyte 15. First, the first compound having at least two isocyanate groups is dissolved in an ionic liquid containing a redox couple. Subsequently, the second compound having at least two nucleophilic groups containing active hydrogen is dissolved, thereby preparing the mixed solution before gelation. In this process, the order of the dissolution of the compounds is not particularly limited; however, when the first compound and the second compound are directly mixed with each other, a reaction rapidly occurs so as to immediately produce a solid form. Hence, the case described above is not preferable.

Next, the mixed solution is injected into the dye-sensitized solar cell 11 assembled as described above. The method for injecting the mixed solution is not specifically limited; however, a method is preferably performed in which after the compounds are thoroughly dissolved, the mixed solution is injected inside the dye-sensitized solar cell 11 which is sealed beforehand and which is provided with the inlet opening for the mixed solution. In this case, a method can be easily performed in which after several droplets of the mixed solution are dripped in the inlet opening, the mixed solution is injected using a capillary phenomenon. In addition, whenever necessary, the injection of the mixed solution may be performed at a reduced pressure. After the mixed solution is entirely injected, the mixed solution remaining at the inlet opening is removed, and this inlet opening is then sealed. This sealing method is also not particularly limited, and whenever necessary, sealing may be performed by bonding a glass plate to the inlet opening with a sealing agent.

After injected into the dye-sensitized solar cell 11, the mixed solution before gelation is preferably allowed to stand until the polymerization of the first compound having at least two isocyanate groups and the second compound having at least two nucleophilic groups containing active hydrogen is completed by the polyaddition reaction. The standing time is not particularly limited; however, the time in which the mixed solution injected inside the dye-sensitized solar cell 11 completely loses its viscosity and the gelation is completed is in the range of approximately 1 minute to 48 hours. However, the time described above may vary in some cases in accordance with various conditions, that is, in accordance with the selections of the first and the second compounds, the ionic liquid, and the like. In addition, the ambient temperature of the standing atmosphere is not particularly limited; however, it is generally in the range of from 0 to 100° C. and is preferably in the range of from 0 to 60° C. for reducing the influence on the dye and the electrolyte.

As described above, the dye-sensitized solar cell 11 can be formed.

In the dye-sensitized solar cell 11 thus formed, since the solid electrolyte 15 described above is provided, degradation in properties due to leakage and evaporation of an electrolyte solution does not occur, and hence a dye-sensitized solar cell having superior reliability can be realized.

In addition, in this dye-sensitized solar cell 11, since the matrix polymer of the solid electrolyte 15 is a polymer formed of the above first and second compounds by the polyaddition reaction and has a chemically cross-linking structure, the solid electrolyte 15 is not changed into a liquid form by heating, and hence a dye-sensitized solar cell having superior mechanical properties and durability can be realized.

In addition, in the case in which a solid electrolyte is used for a dye-sensitized solar cell, when the solid electrolyte is formed beforehand and is then provided so as to be in close contact with a semiconductor layer for forming the dye-sensitized solar cell, since the semiconductor layer and the solid electrolyte each having its own shape, that is, each having a solidified surface shape, are brought into contact with each other, adhesion between the semiconductor layer and the solid electrolyte is not satisfactory. As a result, due to the insufficient contact between the semiconductor layer and the solid electrolyte, a problem may arise in that the solar-energy conversion efficiency is decreased.

However, in this dye-sensitized solar cell 11, since the precursor for the solid electrolyte 15, which is in a state before polymerization and which has fluidity, is injected into the dye-sensitized solar cell, followed by polymerization, the pores of the electrode surface are sufficiently filled with the electrolyte, and in addition, the adhesion of the solid electrolyte 15 with the semiconductor fine particles of the semiconductor layer 4 and the platinum layer 6 used as the counter electrode can be increased. Accordingly, since the contact between the semiconductor layer 4 and the solid electrolyte 15 can be satisfactorily secured, the chemical bonding condition at the electrochemical interface between the solid electrolyte 15 and the electrode surface is improved, thereby realizing a dye-sensitized solar cell having superior photoelectric conversion properties.

In addition, in this dye-sensitized solar cell 11, since the solid electrolyte 15 is formed by polymerization in accordance with the polyaddition reaction, the use of heat and active rays is not necessary. Accordingly, the electrolyte composition is not degraded by the use of heat and active rays in production of the solid electrolyte, and hence a photovoltaic device having superior photoelectric conversion properties can be realized. In addition, the manufacturing process is simple, and the productivity is superior.

In addition, in this dye-sensitized solar cell 11, since this solid electrolyte 15 is formed by the polyaddition reaction and is not formed by radical polymerization, even when iodine which functions as a polymerization inhibitor in a radical polymerization method is contained in the electrolyte composition, the solid electrolyte 15 can be easily formed, and in addition, the solid electrolyte 15 can be in situ formed in a cell device. Hence, according to this dye-sensitized solar cell 11, a dye-sensitized solar cell having superior photoelectric conversion properties can be easily and reliably formed.

Figure 3:
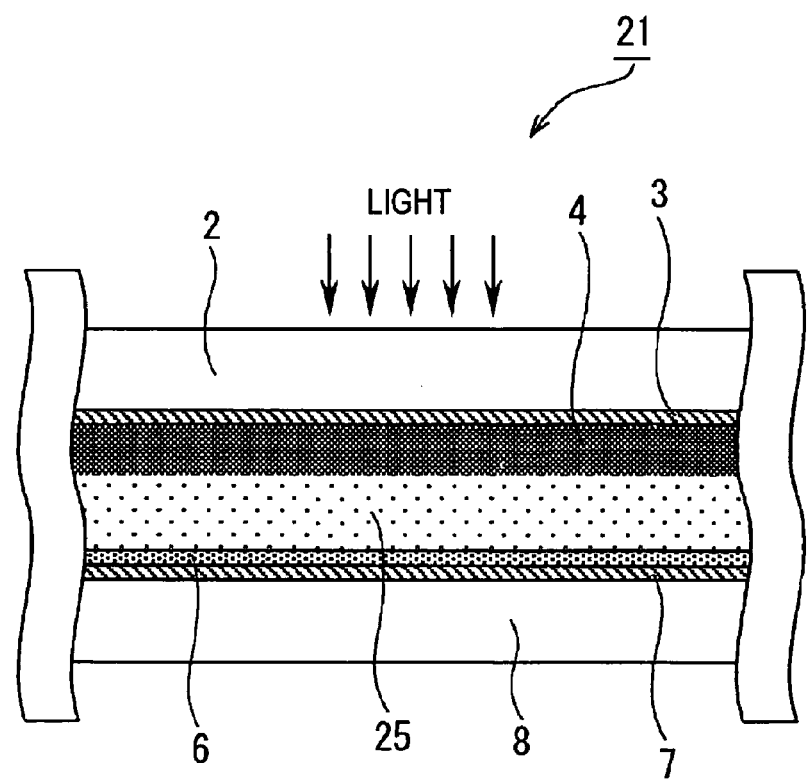
FIG. 3 is a cross-sectional view showing another structural example of a dye-sensitized solar cell formed in accordance with the present invention.

Next, another solid electrolyte and photovoltaic device, according to the present invention, and manufacturing methods thereof will be described in detail. FIG. 3 is a cross-sectional view showing the structure of another dye-sensitized solar cell formed in accordance with the present invention. As shown in FIG. 3, a dye-sensitized solar cell 21 is formed of the transparent substrate 2, the transparent electrode 3, the semiconductor layer 4, a solid electrolyte 25, the platinum layer 6 treated by platinum chloride, the transparent electrode 7, and the transparent substrate 8. In this dye-sensitized solar cell 21, the same reference numerals of the constituent elements of the above dye-sensitized solar cell 1 shown in FIG. 1 designate the same constituent elements, and descriptions thereof in detail will be omitted. A difference between the dye-sensitized solar cell 21 and the dye-sensitized solar cell 1, that is, in more particular, the solid electrolyte 25 will only be described.

The solid electrolyte 25 is a formed of a gel electrolyte or an entire solid electrolyte, which functions as a carrier transport layer, and is a polymer material having a cross-linking matrix formed by polymerization of a first compound having at least two unsaturated double bonds and a second compound having at least two nucleophilic groups containing active hydrogen in accordance with the Michael addition reaction. Accordingly, in this dye-sensitized solar cell, when the solid electrolyte 25 formed of a gel electrolyte or an entire solid electrolyte is used as the electrolyte layer, the decrease of the electrolyte layer due to leakage and evaporation of liquid can be prevented, which occurs when an electrolyte solution is used, and hence a dye-sensitized solar cell having superior cell properties and reliability can be realized.

In this case, the unsaturated double bond of the first compound is preferably an $\alpha,\beta$-unsaturated carbonyl group, an $\alpha,\beta$-unsaturated sulfonyl group, or an $\alpha,\beta$-unsaturated nitrile group, and among those mentioned above, the $\alpha,\beta$-unsaturated carbonyl group is more preferable. The first compound and the second compound each preferably have ether, ester, carbonate, alkyl, perfluorocarbon, nitrile, tertiary amine, or the like at the main and the side chains. The number of the unsaturated double bonds of the first compound is preferably at least two; however, when the number of the nucleophilic groups containing active hydrogen of the second compound is two, the number of the unsaturated double bonds of the first compound must be at least three. As is the case described above, the number of the nucleophilic groups containing active hydrogen of the second compound is preferably at least two; however, when the number of the unsaturated double bonds of the first compound is two, the number of the nucleophilic groups containing active hydrogen of the second compound must be at least three.

In addition, compounds having different structures may be used alone or in combination.

When the solid electrolyte 25 is a gel electrolyte, the gel electrolyte is composed of an electrolyte composition containing a solvent and the above cross-linking matrix, and the cross-linking matrix occupies 3 to 50 percent by weight of the gel electrolyte. As the solvent forming the electrolyte composition, for example, there may be mentioned water, alcohol, ether, ester, carbonic acid ester, lactone, carboxylic acid ester, phosphate triester, heterocyclic compound, nitrile, ketone, amide, nitormethane, halogenated hydrocarbon, dimethyl sulfoxide, sulfolane, N-methyl pyrrolidone, 1,3-dimethyl imidazolidinone, 3-methyl oxazolidinone, or hydrocarbon. However, the solvent is not limited to those mentioned above, and the aforementioned solvents may be used alone or in combination. In addition, among the solvents mentioned above, aprotic nonaqueous solvents are more preferable.

When the ratio of the electrolyte composition to the gel electrolyte is increased, the ion conductivity is increased, and on the other hand, the mechanical strength is decreased. On the contrary, as the ratio of the electrolyte composition to the gel electrolyte is decreased, the mechanical strength is increased, but the ion conductivity is decreased. Hence, the electrolyte composition preferably occupies 50 to 97 percent by weight of the gel electrolyte and more preferably occupies 80 to 95 percent by weight thereof.

As the electrolytes used for the gel electrolyte, in addition to the combination of $I_2$ and a metal iodide or an organic iodide and the combination of $Br_2$ and a metal bromide or an organic bromide, for example, metal complexes such as ferrocyanate/ferricyanate and ferrocene/ferricinium ion; sulfur compounds, such as sodium polysulfide and alkylthiol/alkyldisulfide; violgone dyes; and hydroquinone/quinone may be used.

As cations of the above metal compounds, Li, Na, K, Mg, Ca, Cs, and the like are preferable, and as cations of the above organic compounds, quaternary ammonium compounds, such as tetraalkylammonium, pyridinium, and imidazolium, are preferable. However, the cations are not limited to those mentioned above, and the above materials may be used alone or in combination.

Among those mentioned above, the combination of $I_2$ and LiI or a quaternary ammonium compound such as imidazolium iodide is preferably used as the electrolyte. The concentration of the electrolyte salt is preferably 0.05 to 5 M to the solvent and is more preferably 0.2 to 1 M. The concentration of $I_2$ or $Br_2$ is preferably 0.0005 to 1 M and is more preferably 0.001 to 0.1 M. In addition, in order to improve the open-circuit voltage and short-circuit current, various additives such as 4-tert-butylpyridine and a carboxylic acid may also be added.

In addition, when the solid electrolyte 25 is an entire solid electrolyte, the entire solid electrolyte is formed of the cross-linking matrix containing iodine redox. As the electrolytes, in addition to the combination of $I_2$ and a metal iodide or an organic iodide and the combination of $Br_2$ and a metal bromide or an organic bromide, for example, metal complexes such as ferrocyanate/ferricyanate and ferrocene/ferricinium ion; sulfur compounds, such as sodium polysulfide and alkylthiol/alkyldisulfide; violgone dyes; and hydroquinone/quinone may be used.

As cations of the above metal compounds, Li, Na, K, Mg, Ca, Cs, and the like are preferable, and as cations of the above organic compounds, quaternary ammonium compounds, such as tetraalkylammonium, pyridinium, and imidazolium, are preferable. However, the cations are not limited to those mentioned above, and the above materials may be used alone or in combination. Among those mentioned above, the combination of $I_2$ and LiI or a quaternary ammonium compound such as imidazolium iodide is preferably used as the electrolyte. The concentration of the electrolyte salt is preferably 0.05 to 5 M with respect to the monomer and is more preferably 0.2 to 1 M. In addition, the concentration of $I_2$ or $Br_2$ is preferably 0.0005 to 1 M and is more preferably 0.001 to 0.1 M.

Since the solid electrolyte 25 having the structure as described above is formed of a gel electrolyte or an entire solid electrolyte, degradation in properties due to leakage and evaporation of an electrolyte solution does not occur, and hence a highly reliable electrolyte can be realized.

In addition, since being a polymer formed by the Michael addition reaction between the above first and the second compounds and having a cross-linking structure, the matrix polymer of the solid electrolyte 25 is not changed into a liquid form by heating, and hence superior mechanical properties and durability can be obtained.

In addition, since a precursor for this solid electrolyte 25, which is in a state before polymerization and which has fluidity, is brought into contact with a surface on which the solid electrolyte is to be formed, that is, with an electrode surface, followed by polymerization, the pores of the electrode surface are sufficiently filled with the electrolyte, and in addition, the chemical bonding condition at the electrochemical interface between the solid electrolyte 25 and the electrode surface is improved, thereby obtaining superior conductive properties.

In addition, since the solid electrolyte 25 is formed by polymerizing the above first and the second compounds in accordance with the Michael addition reaction, the use of heat and active rays is not necessary in polymerization. Accordingly, the electrolyte composition is not degraded by the use of heat and active rays in production, and hence an electrolyte having superior conductive properties can be realized. In addition, the manufacturing process is simple, and the productivity is superior.

In addition, since this solid electrolyte 25 is formed by the Michael addition reaction and is not formed by radical polymerization, even when iodine which functions as a polymerization inhibitor in a radical polymerization method is contained in the electrolyte composition, the solid electrolyte 25 can be easily formed, and in addition, since being in situ formed in a cell device, the solid electrolyte is preferably applied to a photovoltaic device or the like which uses an iodine redox couple.

In addition, the above dye-sensitized solar cell 21 can be formed as described below.

First, on one major surface of the transparent substrate 2, the transparent electrode 3 is formed, and on the transparent electrode 3, the semiconductor layer 4 carrying the dye is formed, thereby forming the semiconductor electrode. In addition, on one major surface of the transparent substrate 8, the transparent electrode 7 is formed, and on the transparent electrode 7, the platinum layer 6 treated using platinum chloride is formed. Subsequently, after the semiconductor layer 4 carrying the dye and the platinum layer 6 are disposed to face each other, side surfaces of the transparent substrate 2 and the transparent substrate 7 are sealed so that the semiconductor electrode and the counter electrode are not brought into contact with each other. In this step, the distance between the semiconductor electrode and the counter electrode is not particularly limited; however, the distance is generally 1 to 100 μm and is more preferably 1 to 30 μm. When this distance is excessively large, the conductivity is decreased, and as a result, the amount of photocurrent is unfavorably decreased.

In addition, although the sealing method is not specifically limited, a material having light resistance, insulating properties, and humidity resistance is preferably used, and for example, an epoxy resin, a UV curable resin, an acrylic adhesive, ethylene vinyl acetate (EVA), a ceramic, or a heat sealable film may be used. In addition, the photovoltaic device of the present invention must have an inlet opening through which a solution before gelation is injected. The place of the inlet opening is not particularly limited except locations at which the semiconductor layer 4 carrying the dye and part of the counter electrode, which faces the semiconductor layer 4, are present, and hence the inlet opening may be provided at an optional place.

Next, a mixed solution is prepared which serves as the precursor for the gel electrolyte 25. The first compound having at least two unsaturated double bonds is first dissolved in an electrolyte solution which is the electrolyte composition. Subsequently, the second compound having at least two nucleophilic groups containing active hydrogen is dissolved, thereby preparing the mixed solution before gelation. Since the nucleophilic groups containing active hydrogen of this second compound are inactivated by reaction with carbonic acid ester or lactone, when ester, carbonic acid ester, or lactone is used as the solvent for the electrolyte, the first compound must be dissolved first, followed by dissolution of the second compound.

The mixed solution is injected into the dye-sensitized solar cell 21 assembled as described above. The method for injecting the mixed solution is not specifically limited; however, a method is preferably performed in which after the compounds are thoroughly dissolved, the mixed solution is injected inside the dye-sensitized solar cell 21 which is sealed beforehand and which is provided with the inlet opening for the mixed solution. In this case, a method can be easily performed in which after several droplets of the mixed solution are dripped in the inlet opening, the mixed solution is injected using a capillary phenomenon. In addition, whenever necessary, the injection of the mixed solution may be performed at a reduced pressure. After the mixed solution is entirely injected, the mixed solution remaining at the inlet opening is removed, and this inlet opening is then sealed. This sealing method is also not particularly limited, and whenever necessary, sealing may be performed by bonding a glass plate to the inlet opening with a sealing agent.

After injected into the dye-sensitized solar cell 21, the mixed solution before gelation is preferably allowed to stand until the polymerization of the first compound having at least two unsaturated double bonds and the second compound having at least two nucleophilic groups containing active hydrogen is completed by the Michael addition reaction. The standing time is not particularly limited; however, the time in which the mixed solution injected inside the dye-sensitized solar cell 21 completely loses its viscosity and the gelation is completed is in the range of approximately 1 minute to 48 hours. However, the time described above may vary in some cases in accordance with various conditions, that is, in accordance with the selections of the first and the second compounds, the electrolyte, the solvent, and the like. In addition, the ambient temperature of the standing atmosphere is not particularly limited; however, it is generally in the range of from 0 to 100° C. and is preferably in the range of from 0 to 60° C. for reducing the influence on the dye and the electrolyte.

In the dye-sensitized solar cell 21 thus formed, since the solid electrolyte 25 described above is provided, degradation in properties due to leakage and evaporation of an electrolyte solution does not occur, and hence a dye-sensitized solar cell having superior reliability can be realized.

In addition, in this dye-sensitized solar cell 21, since the matrix polymer of the solid electrolyte 25 is a polymer formed by polymerization of the above first and the second compounds in accordance with the Michael addition reaction and has a chemically cross-linking structure, the solid electrolyte 25 is not changed into a liquid form by heating, and hence a dye-sensitized solar cell having superior mechanical properties and durability can be realized.

In addition, in the case in which a solid electrolyte is used for a dye-sensitized solar cell, when the solid electrolyte is formed beforehand and is then provided so as to be in close contact with a semiconductor layer for forming the dye-sensitized solar cell, since the semiconductor layer and the solid electrolyte each having its own shape, that is, each having a solidified surface shape, are brought into contact with each other, adhesion between the semiconductor layer and the solid electrolyte is not satisfactory. As a result, due to the insufficient contact between the semiconductor layer and the solid electrolyte, a problem may arise in that the solar-energy conversion efficiency is decreased.

However, in this dye-sensitized solar cell 21, since the precursor for the solid electrolyte 25, which is in a state before polymerization and which has fluidity, is injected into the dye-sensitized solar cell, followed by polymerization, the pores of the electrode surface are sufficiently filled with the electrolyte, and in addition, the adhesion of the solid electrolyte 25 with the semiconductor fine particles of the semiconductor layer 4 and the platinum layer 6 used as the counter electrode can be increased. Accordingly, since the contact between the semiconductor layer 4 and the solid electrolyte 25 can be satisfactorily secured, the chemical bonding condition at the electrochemical interface between the solid electrolyte 25 and the electrode surface is improved, thereby realizing a dye-sensitized solar cell having superior photoelectric conversion properties.

In addition, in this dye-sensitized solar cell 21, since the solid electrolyte 25 is formed by polymerization in accordance with the Michael addition reaction, the use of heat and active rays is not necessary. Accordingly, the electrolyte composition is not degraded by the use of heat and active rays in production of the solid electrolyte, and hence a photovoltaic device having superior photoelectric conversion properties can be realized. In addition, the manufacturing process is simple, and the productivity is superior.

In addition, in this dye-sensitized solar cell 21, since this solid electrolyte 25 is formed by the Michael addition reaction and is not formed by radical polymerization, even when iodine which functions as a polymerization inhibitor in a radical polymerization method is contained in the electrolyte composition, the solid electrolyte 25 can be easily formed, and in addition, the solid electrolyte 25 can be in situ formed in a cell device. Hence, according to this dye-sensitized solar cell 21, a dye-sensitized solar cell having superior photoelectric conversion properties can be easily and reliably formed.

In the above solid electrolyte formed by the use of the Michael addition reaction, by using an ionic liquid, that is, a molten salt, instead of the electrolyte composition containing a solvent, a gel electrolyte having no vapor pressure can also be realized.

Figure 4:
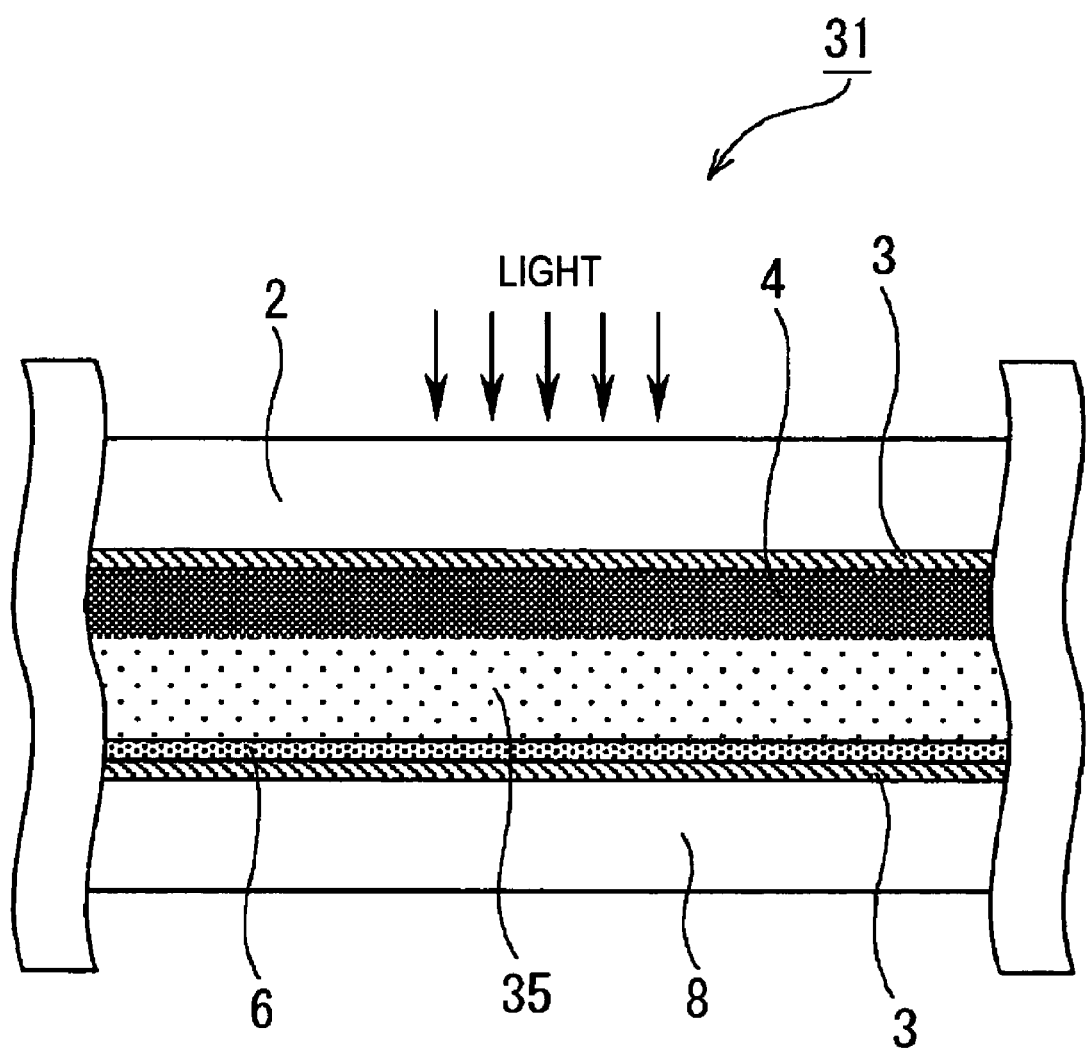
FIG. 4 is a cross-sectional view showing another structural example of a dye-sensitized solar cell formed in accordance with the present invention.

Next, another solid electrolyte and photovoltaic device, according to the present invention, and manufacturing methods thereof will be described in detail. FIG. 4 is a cross-sectional view showing the structure of another dye-sensitized solar cell formed in accordance with the present invention. As shown in FIG. 4, a dye-sensitized solar cell 31 is formed of the transparent substrate 2, the transparent electrode 3, the semiconductor layer 4, a solid electrolyte 35, the platinum layer 6 treated by platinum chloride, the transparent electrode 7, and the transparent substrate 8. In this dye-sensitized solar cell 31, the same reference numerals of the constituent elements of the above dye-sensitized solar cell 1 shown in FIG. 1 designate the same constituent elements, and descriptions thereof in detail will be omitted. A difference between the dye-sensitized solar cell 31 and the dye-sensitized solar cell 1, that is, in more particular, the solid electrolyte 35 will only be described.

The solid electrolyte 35 is a formed of a gel electrolyte which functions as a carrier transport layer, and is a polymer material having a cross-linking matrix formed by polymerization of a first compound having at least two unsaturated double bonds and a second compound having at least two nucleophilic groups containing active hydrogen in accordance with the Michael addition reaction. In addition, the solid electrolyte 35 is formed of an ionic liquid containing a redox couple and 3 to 50 percent by weight of the cross-linking matrix described above. Accordingly, in this dye-sensitized solar cell, when the solid electrolyte 35 formed of the gel electrolyte is used as the electrolyte layer, the decrease of the electrolyte layer due to leakage and evaporation of liquid can be prevented, which occurs when an electrolyte solution is used, and hence a dye-sensitized solar cell having superior cell properties and reliability can be realized.

In this case, the unsaturated double bond of the first compound is preferably an $\alpha,\beta$-unsaturated carbonyl group, an $\alpha,\beta$-unsaturated sulfonyl group, or an $\alpha,\beta$-unsaturated nitrile group, and among those mentioned above, the $\alpha,\beta$-unsaturated carbonyl group is more preferable. The first compound and the second compound each preferably have ether, ester, carbonate, alkyl, perfluorocarbon, nitrile, tertiary amine, or the like at the main and the side chains. The number of the unsaturated double bonds of the first compound is preferably at least two; however, when the number of the nucleophilic groups containing active hydrogen of the second compound is two, the number of the unsaturated double bonds of the first compound must be at least three. As is the case described above, the number of the nucleophilic groups containing active hydrogen of the second compound is preferably at least two; however, when the number of the unsaturated double bonds of the first compound is two, the number of the nucleophilic groups containing active hydrogen of the second compound must be at least three.

In addition, compounds having different structures may be used alone or in combination.

As the ionic liquid, for example, there may be mentioned a pyridinium salt, an imidazolium salt, or a triazorium salt; however, the ionic liquid is not limited thereto. In addition, those mentioned above may be used alone or in combination. The melting point of the ionic liquid is preferably 100° C. or less, more preferably 80° C. or less, and particularly preferably 60° C. or less.

When the ratio of the ionic liquid to the gel electrolyte is increased, the ion conductivity is increased thereby, but the mechanical strength is decreased. On the other hand, as the ratio of the ionic liquid to the gel electrolyte is decreased, the mechanical strength is increased; however, the ion conductivity is decreased. Hence, the ionic liquid preferably occupies 50 to 97 percent by weight of the gel electrolyte and more preferably occupies 80 to 95 percent by weight thereof.

As the redox couple used for the gel electrolyte of the present invention, the combination of $I_2$ and an ionic liquid of iodide or the combination of $Br_2$ and an ionic liquid of bromide is preferable, and in particular, the combination of $I_2$ and the ionic liquid is preferable. The concentration of the redox species to the total electrolyte is preferably 0.1 to 20 percent by weight and is more preferably 0.2 to 5 percent by weight.

In addition, besides the materials mentioned above, as the anion forming the ionic liquid, for example, there may be mentioned a halogen ion such as $Cl^{-1}$ or $Br^{-1}$, $NSC^{-1}$, $BF_4^{-1}$, $PF_6^{-1}$, $ClO_4^{-1}$, $(CF_3SO_2)_2N^{-1}$, $(CF_3CF_2SO_2)_2N^{-1}$, $CF_3SO_3^{-1}$, $CF_3COO^{-1}$, $Ph_4B^{-1}$, $(CF_3SO_2)_3C^{-1}$, or $F(HF)_n$, and among those mentioned above, $(CF_3SO_2)_2N^{-1}$ or $BF_4^{-1}$ is preferable.

In addition, as the redox couples in this case, besides the combination with a metal iodide or an organic iodide, and the combination of $Br_2$ and a metal bromide or an organic bromide, for example, metal complexes such as ferrocyanate/ferricyanate and ferrocene/ferricinium ion; sulfur compounds, such as sodium polysulfide and alkylthiol-alkyldisulfide; viologne dyes; and hydroquinone/quinone may be used.

As cations of the above metal compounds, Li, Na, K, Mg, Ca, Cs, and the like are preferable, and as cations of the above organic compounds, quaternary ammonium compounds, such as tetraalkylammonium, pyridinium, and imidazolium, are preferable. However, the cations are not limited to those mentioned above, and the above materials may be used alone or in combination. Among those mentioned above, an electrolyte formed in combination of $I_2$ and a quaternary ammonium compound such as imidazolium iodide is preferably used.

The concentration of the electrolyte salt is preferably 0.05 to 5 M with respect to the ionic liquid and is more preferably 0.2 to 1 M. The concentration of $I_2$ or $Br_2$ is preferably 0.0005 to 1 M and is more preferably 0.001 to 0.1 M. In addition, in order to improve the open-circuit voltage and short-circuit current, various additives such as 4-tert-butylpyridine and a carboxylic acid may also be added.

Since the solid electrolyte 35 having the structure as described above is formed of the gel electrolyte, degradation in properties due to leakage and evaporation of an electrolyte solution does not occur, and hence a highly reliable electrolyte can be realized.

In addition, since being a polymer formed by polymerization of the above first and the second compounds in accordance with the Michael addition reaction and having a chemically cross-linking structure, the matrix polymer of the solid electrolyte 35 is not changed into a liquid form by heating, and hence superior mechanical properties and durability can be obtained.

In addition, since a precursor for the solid electrolyte 35, which is in a state before polymerization and has fluidity, is brought into contact with a surface on which the solid electrolyte is to be formed, for example, with an electrode surface, followed by polymerization, the pores of the electrode surface are sufficiently filled with the electrolyte, and in addition, the chemical bonding condition at the electrochemical interface between the solid electrolyte and the electrode surface is improved, thereby obtaining superior conductive properties.

In addition, since the solid electrolyte 35 is formed by polymerizing the above first and second compounds in accordance with the Michael addition reaction, the use of heat and active rays is not necessary in polymerization. Accordingly, the electrolyte composition is not degraded by the use of heat and active rays in production, and hence an electrolyte having superior conductive properties can be realized. In addition, the manufacturing process is simple, and the productivity is superior.

In addition, since this solid electrolyte 35 is formed by the Michael addition reaction and is not formed by radical polymerization, even when iodine which functions as a polymerization inhibitor in a radical polymerization method is contained in the electrolyte composition, the solid electrolyte can be easily formed, and in addition, since being in situ formed in a cell device, the solid electrolyte can be preferably applied to a photovoltaic device or the like which uses an iodine redox couple.

In addition, the above dye-sensitized solar cell 31 can be formed as described below.

First, on one major surface of the transparent substrate 2, the transparent electrode 3 is formed, and on the transparent electrode 3, the semiconductor layer 4 carrying the dye is formed, thereby forming the semiconductor electrode. In addition, on one major surface of the transparent substrate 8, the transparent electrode 7 is formed, and on the transparent electrode 7, the platinum layer 6 treated using platinum chloride is formed. Subsequently, the semiconductor layer 4 carrying the dye and the platinum layer 6 are disposed to face each other, and side surfaces of the transparent substrate 2 and the transparent substrate 7 are sealed so that the semiconductor electrode and the counter electrode are not brought into contact with each other. In this step, the distance between the semiconductor electrode and the counter electrode is not particularly limited; however, the distance is generally 1 to 100 µm and is more preferably 1 to 30 µm. When this distance is excessively large, the conductivity is decreased, and as a result, the amount of photocurrent is unfavorably decreased.

In addition, although the sealing method is not specifically limited, a material having light resistance, insulating properties, and humidity resistance is preferably used, and for example, an epoxy resin, a UV curable resin, an acrylic adhesive, ethylene vinyl acetate (EVA), a ceramic, or a heat sealable film may be used. In addition, the photovoltaic device of the present invention must have an inlet opening through which a solution before gelation is injected. The place of the inlet opening is not particularly limited except locations at which the semiconductor layer 4 carrying the dye and part of the counter electrode, which faces the semiconductor layer 4, are present, and hence the inlet opening may be provided at an optional place.

Next, a mixed solution is prepared which serves as a precursor for the gel electrolyte. First, the first compound having at least two unsaturated double bonds is dissolved in an ionic liquid containing a redox couple. Subsequently, the second compound having at least two nucleophilic groups containing active hydrogen is dissolved, thereby preparing the mixed solution before gelation. In this process, the order of the dissolution of the compounds is not particularly limited; however, when the first compound and the second compound are directly mixed with each other, a reaction rapidly occurs so as to immediately produce a solid form. Hence, the case described above is not preferable.

Next, the mixed solution is injected into the dye-sensitized solar cell 31 assembled as described above. The method for injecting the mixed solution is not specifically limited; however, a method is preferably performed in which after the compounds are thoroughly dissolved, the mixed solution is injected inside the dye-sensitized solar cell 31 which is sealed beforehand and which is provided with the inlet opening for the mixed solution. In this case, a method can be easily performed in which after several droplets of the mixed solution are dripped in the inlet opening, the mixed solution is injected using a capillary phenomenon. In addition, whenever necessary, the injection of the mixed solution may be performed at a reduced pressure. After the mixed solution is entirely injected, the mixed solution remaining at the inlet opening is removed, and this inlet opening is then sealed. This sealing method is also not particularly limited, and whenever necessary, sealing may be performed by bonding a glass plate to the inlet opening with a sealing agent.

After injected into the dye-sensitized solar cell 31, the mixed solution before gelation is preferably allowed to stand until the polymerization of the first compound having at least two unsaturated double bonds and the second compound having at least two nucleophilic groups containing active hydrogen is completed by the Michael addition reaction. The standing time is not particularly limited; however, the time in which the mixed solution injected inside the dye-sensitized solar cell 31 completely loses its viscosity and the gelation is completed is in the range of approximately 1 minute to 48 hours. However, the time described above may vary in some cases in accordance with various conditions, that is, in accordance with the selections of the first and the second compounds, the ionic liquid, and the like. In addition, the ambient temperature of the standing atmosphere is not particularly limited; however, it is generally in the range of from 0 to 100° C. and is preferably in the range of from 0 to 60° C. for reducing the influence on the dye and the electrolyte.

As described above, the dye-sensitized solar cell 31 can be formed.

In the dye-sensitized solar cell 31 thus formed, since the solid electrolyte 35 described above is provided, degradation in properties does not occur which is caused by leakage and evaporation of an electrolyte solution, and hence a dye-sensitized solar cell having superior reliability can be realized.

In addition, in this dye-sensitized solar cell 31, since the matrix polymer is a polymer formed of the above first and second compounds by the Michael addition reaction and has a chemically cross-linking structure, the solid electrolyte 35 is not changed into a liquid form by heating, and hence a dye-sensitized solar cell having superior mechanical properties and durability can be realized.

In addition, in the case in which a solid electrolyte is used for a dye-sensitized solar cell, when the solid electrolyte is formed beforehand and is then provided so as to be in close contact with a semiconductor layer for forming the dye-sensitized solar cell, since the semiconductor layer and the solid electrolyte each having its own shape, that is, each having a solidified surface shape, are brought into contact with each other, adhesion between the semiconductor layer and the solid electrolyte is not satisfactory. As a result, due to the insufficient contact between the semiconductor layer and the solid electrolyte, a problem may arise in that the solar-energy conversion efficiency is decreased.

However, in this dye-sensitized solar cell 31, since the precursor for the solid electrolyte 35, which is in a state before polymerization and which has fluidity, is injected into the dye-sensitized solar cell, followed by polymerization, the pores of the electrode surface are sufficiently filled with the electrolyte, and in addition, the adhesion of the solid electrolyte 35 with the semiconductor fine particles of the semiconductor layer 4 and the platinum layer 6 used as the counter electrode can be increased. Accordingly, since the contact between the semiconductor layer 4 and the solid electrolyte 35 can be satisfactorily secured, the chemical bonding condition at the electrochemical interface between the solid electrolyte 35 and the electrode surface is improved, thereby realizing a dye-sensitized solar cell having superior photoelectric conversion properties.

In addition, in this dye-sensitized solar cell 31, since the solid electrolyte 35 is formed by polymerization in accordance with the Michael addition reaction, the use of heat and active rays is not necessary. Accordingly, the electrolyte composition is not degraded by the use of heat and active rays in production of the solid electrolyte, and hence a photovoltaic device having superior photoelectric conversion properties can be realized. In addition, the manufacturing process is simple, and the productivity is superior.

In addition, in this dye-sensitized solar cell 31, since this solid electrolyte 35 is formed by the Michael addition reaction and is not formed by radical polymerization, even when iodine which functions as a polymerization inhibitor in a radical polymerization method is contained in the electrolyte composition, the solid electrolyte 35 can be easily formed, and in addition, the solid electrolyte 35 can be in situ formed in a cell device. Hence, according to this dye-sensitized solar cell 31, a dye-sensitized solar cell having superior photoelectric conversion properties can be easily and reliably formed.

In addition, the photovoltaic device of the present invention is not limited to the structures described above and may be optionally formed in various shapes in accordance with applications.

EXAMPLES

Hereinafter, the present invention will be described in more detail with reference to particular experimental results.

Experiment 1

In Experiment 1, a photovoltaic device provided with a gel electrolyte of the present invention was investigated.

Example 1

In Example 1, as the photovoltaic device of the present invention, a dye-sensitized solar cell was formed as described below. First, a $TiO_2$ paste was formed. The formation of the $TiO_2$ paste was performed based on the information disclosed in "Novel Technique of Dye-Sensitizing Solar Cell" (CMC). First, 125 ml of titanium isopropoxide was dripped into 750 ml of an aqueous nitric acid solution at a concentration of 0.1 M while it was slowly stirred at room temperature. After the dripping was finished, the mixture thus formed was placed in a temperature-control oven at 80° C. and was then stirred for 8 hours, thereby forming a white translucent sol solution.

Next, after this sol solution was allowed to stand for cooling until the temperature thereof decreased to room temperature and was then filtrated using a glass filter, dilution was performed using a messflask, thereby forming a solution having a total volume of 700 ml. The sol solution thus formed was placed in an autoclave and was then processed by hydrothermal treatment at 220° C. for 12 hours, followed by dispersion process by ultrasonic treatment for 1 hour.

Next, this solution was concentrated using an evaporator at 40° C. so that the content of $TiO_2$ was 11 percent by weight. Next, polyethylene oxide (PEO) having a molecular weight of 500,000 was added to this concentrated sol solution and was then mixed together by a planetary ball mill, and as a result, a $TiO_2$ paste having an increased viscosity was obtained.

Next, after the $TiO_2$ paste thus obtained was applied by screen printing onto a fluorine-doped conductive glass substrate having a sheet resistance of 10Ω/□, which was used as a transparent electrode, so as to form a film having a size of 1 cm by 1 cm, $TiO_2$ was sintered on the conductive glass under the conditions in which a temperature of 450° C. was held for 30 minutes, and as a result, a semiconductor layer was formed.

Next, the layer thus formed was immersed for 12 hours in a dehydrated ethanol solution containing 0.5 mM of cis-bis (isothiocyanate)-N,N-bis(2,2'-dipyridyl-4,4'-dicarboxilic acid)-ruthenium (II) dihydrate and 20 mM of deoxycholic acid, so that a dye was adsorbed on the semiconductor layer. Washing was sequentially performed using an ethanol solution containing 4-tert-butylpyridine and dehydrated ethanol in that order, and drying was performed at a dark place, thereby forming a semiconductor electrode.

Next, platinum was sputtered to have a thickness of 100 nm onto a fluorine-doped conductive glass substrate which was provided with an inlet opening having a diameter of 1 mm and which had a sheet resistance of $10\Omega/\square$, and several droplets of an ethanol solution containing chloroplatinic acid were dripped onto the platinum thus sputtered, followed by heating at 450° C., thereby forming a counter electrode.

Next, the semiconductor electrode and the counter electrode, which were formed as described above, were disposed to face each other and were sealed using a heat sealable film having a thickness of 20 μm so that the above two electrodes were not brought into contact with each other, thereby forming a dye-sensitized solar cell.

In addition, in 3 g of a solvent composed of ethylene carbonate and propylene carbonate at a weight ratio of 1 to 1, 0.2 g of lithium iodide (LiI), 0.479 g of 1-propyl-2,3-dimethylimidazolium iodide, 0.0381 g of iodine ($I_2$), and 0.2 g of 4-tert-butylpyridine were dissolved, thereby preparing an electrolyte solution which was an electrolyte composition.

Next, after 100 ppm of dibutyl tin dilaurate was added as a catalyst to the above electrolyte solution, polyoxyethylene glycerin (molecular weight of 1,200) was mixed therewith as the second compound having at least two nucleophilic groups containing active hydrogen, and subsequently, tolylene diisocyanate was also mixed as the first compound having at least two isocyanate groups, so that a mixed solution was prepared. The mixing ratio on a molar basis of the isocyanate group to the nucleophilic group containing active hydrogen was 1 to 1, and the polyoxyethylene glycerin and the tolylene diisocyanate were mixed so that the total thereof is 6 percent by weight with respect to the electrolyte solution.

Next, several droplets of the above mixed solution were dripped in the inlet opening of the dye-sensitized solar cell assembled beforehand and were then injected thereinto by evacuation, followed by sealing of the inlet opening using a heat sealable film and a glass plate. After the mixed solution was injected, this dye-sensitized solar cell was allowed to stand at 80° C. for 30 minutes, and a dye-sensitized solar cell was obtained having a gel electrolyte obtained by gelation of the electrolyte composition.

Example 2

A dye-sensitized solar cell was formed in the same manner as that in Example 1 except that polyoxyethylene pentaerythritol (molecular weight of 1,600) was used as the second compound.

Example 3

A dye-sensitized solar cell was formed in the same manner as that in Example 1 except that hexamethylene diisocyanate was used as the first compound.

Example 4

A dye-sensitized solar cell was formed in the same manner as that in Example 1 except that isophorone diisocyanate was used as the first compound.

Example 5

A dye-sensitized solar cell was formed in the same manner as that in Example 1 except that glycerin was used as the second compound and that the catalyst was not used.

Comparative Example 1

A dye-sensitized solar cell was formed in the same manner as that in Example 1 except that the first compound, the second compound, and the catalyst were not mixed with the electrolyte solution which was the electrolyte composition and that the electrolyte solution was used as the electrolyte layer.

Comparative Example 2

A dye-sensitized solar cell was formed in the same manner as that in Example 1 except that the mixed solution was prepared by mixing polyethylene glycol triacrylate with the electrolyte solution so as to be 6 percent by weight thereto and by mixing 0.15 percent by weight of tert-butyl peroxypivalate as a radical polymerization initiator, and that after injected, this mixed solution was allowed to stand at 60° C. for 1 hour.

Comparative Example 3

A dye-sensitized solar cell was formed in the same manner as that in Example 1 except that the mixed solution was prepared by mixing polyethylene glycol diacrylate with the electrolyte solution so as to be 6 percent by weight thereto and by mixing 0.15 percent by weight of tert-butyl peroxypivalate as a radical polymerization initiator, and that after injected, this mixed solution was allowed to stand at 60° C. for 1 hour.

Comparative Example 4

A dye-sensitized solar cell was formed in the same manner as that in Example 1 except those described below. After the mixed solution was prepared in the same manner as that in Example 1, several droplets of the mixed solution were dripped onto the $TiO_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was then provided on the gel electrolyte layer, followed by sealing using a heat sealable film.

Comparative Example 5

A dye-sensitized solar cell was formed in the same manner as that in Example 2 except those described below. After the mixed solution was prepared in the same manner as that in Example 2, several droplets of the mixed solution were dripped onto the $TiO_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was then provided on the gel electrolyte layer, followed by sealing using a heat sealable film.

Comparative Example 6

A dye-sensitized solar cell was formed in the same manner as that in Example 3 except those described below. After the mixed solution was prepared in the same manner as that in Example 3, several droplets of the mixed solution were dripped onto the $TiO_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was then provided on the gel electrolyte layer, followed by sealing using a heat sealable film.

Comparative Example 7

A dye-sensitized solar cell was formed in the same manner as that in Example 4 except those described below. After the mixed solution was prepared in the same manner as that in Example 4, several droplets of the mixed solution were dripped onto the $TiO_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was then provided on the gel electrolyte layer, followed by sealing using a heat sealable film.

Comparative Example 8

A dye-sensitized solar cell was formed in the same manner as that in Example 5 except those described below. After the mixed solution was prepared in the same manner as that in Example 5, several droplets of the mixed solution were dripped onto the $TiO_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was then provided on the gel electrolyte layer, followed by sealing using a heat sealable film.

The preparation conditions of the mixed solutions according to the examples and comparative examples described above are shown in Table 1.

Solar-energy conversion efficiencies of the dye-sensitized solar cells of Examples 1 to 5 and Comparative Examples 1 to 8 formed as described above were evaluated. The solar-energy conversion efficiency was measured as described below.

Measurement of Solar-energy conversion efficiency The measurement of the solar-energy conversion efficiency was performed by the steps of connecting alligator clips to respective fluorine-doped conductive glass substrates of the dye-sensitized solar cell at the semiconductor electrode side and at the counter electrode side, irradiating the dye-sensitized solar cell with artificial-sunlight (AM1.5, 100 mW/cm$^2$), and measuring a current generated thereby. The results are shown in Table 2.

TABLE 2

|  | Gelation | Solar-energy conversion efficiency (%) |
| --- | --- | --- |
| Example 1 | ○ | 7.9 |
| Example 2 | ○ | 7.7 |
| Example 3 | ○ | 7.9 |
| Example 4 | ○ | 7.8 |
| Example 5 | ○ | 7.5 |
| Comparative example 1 | — | 8.2 |
| Comparative example 2 | X | 4.5*[1] |
| Comparative example 3 | X | 4.7*[1] |
| Comparative example 4 | ○ | 5.6 |
| Comparative example 5 | ○ | 5.6 |
| Comparative example 6 | ○ | 5.5 |
| Comparative example 7 | ○ | 5.4 |
| Comparative example 8 | ○ | 5.3 |

*[1] indicates a reference value since no gelation occurred.

In addition, the individual dye-sensitized solar cells were each decomposed after the measurement of the solar-energy

TABLE 1

|  | First compound | Second compound | Catalyst |
| --- | --- | --- | --- |
| Example 1 | tolylene 2,4-diisocyanate | polyoxyethylene glycerin (molecular weight of 1,200) | dibutyl tin dilaurate |
| Example 2 | tolylene 2,4-diisocyanate | polyoxyethylene pentaerythritol (molecular weight of 1,600) | dibutyl tin dilaurate |
| Example 3 | hexamethylene diisocyanate | polyoxyethylene glycerin (molecular weight of 1,200) | dibutyl tin dilaurate |
| Example 4 | isophorone diisocyanate | polyoxyethylene glycerin (molecular weight of 1,200) | dibutyl tin dilaurate |
| Example 5 | tolylene 2,4-diisocyanate | glycerin | No addition |
| Comparative example 1 | No addition | No addition | No addition |
| Comparative example 2 | polyethylene glycol triacrylate | — | tert-butyl peroxypivalate |
| Comparative example 3 | polyetylene glycol diacrylate | — | tert-butyl peroxypivalate |
| Comparative example 4 | tolylene 2,4-diisocyanate | polyoxyethylene glycerin (molecular weight of 1,200) | dibutyl tin dilaurate |
| Comparative example 5 | tolylene 2,4-diisocyanate | polyoxyethylene pentaerythritol (molecular weight of 1,600) | dibutyl tin dilaurate |
| Comparative example 6 | hexamethylene diisocyanate | polyoxyethylene glycerin (molecular weight of 1,200) | dibutyl in dilaurate |
| Comparative example 7 | isophorone diisocyanate | polyoxyethylene glycerin (molecular weight of 1,200) | dibutyl tin dilaurate |
| Comparative example 8 | tolylene 2,4-diisocyanate | glycerin | No addition | conversion efficiency so that an electrolyte portion provided inside the solar cell was recovered, and the gelation of the electrolyte was confirmed by visual inspection. The results are also shown in Table 2. In Table 2, ○ indicates that gelation occurred, and x indicates that gelation did not occur.

As can be seen from Table 2, in Comparative Examples 2 and 3 in which a conventional radical polymerization method was used, it is understood that the electrolyte composition is not in situ gelled in the dye-sensitized solar cell. On the other hand, in Examples 1 to 5 in which the first compound having at least two isocyanate groups and the second compound having at least two nucleophilic groups containing active hydrogen were polymerized by the polyaddition reaction, it is understood that the electrolyte composition is in situ gelled in the dye-sensitized solar cell and that the gel electrolyte is obtained.

From the above results, it is understood that when the first compound having at least two isocyanate groups and the second compound having at least two nucleophilic groups containing active hydrogen are polymerized by the polyaddition reaction, the electrolyte composition can be in situ gelled in the dye-sensitized solar cell and that the gel electrolyte is obtained.

In addition, when Examples 1 to 5 are compared to Comparative Examples 1, since the decrease in solar-energy conversion efficiency of the dye-sensitized solar cell having the gel electrolyte of the present invention is small as compared to that of the dye-sensitized solar cell formed of the electrolyte solution, it is said that a superior dye-sensitized solar cell having a superior solar-energy conversion efficiency is realized.

In addition, as can be seen from Table 2, in Comparative Examples 4 to 8 in which the gel electrolyte was formed beforehand on the semiconductor layer by polymerizing the first compound having at least two isocyanate groups and the second compound having at least two nucleophilic groups containing active hydrogen in accordance with the polyaddition reaction and in which the dye-sensitized solar cell was formed by providing the counter electrode on the gel electrolyte thus formed, it is understood that although the gel electrolyte is obtained, compared to the dye-sensitized solar cell formed using the electrolyte solution, the solar-energy conversion efficiency is very much decreased. The reason for this is believed that since the chemical bonding condition at the electrochemical interface between the gel electrolyte which is formed beforehand by gelation and the electrode surface is not satisfactory, the resistance is increased.

On the other hand, in Examples 1 to 5 according to the present invention in which the first compound having at least two isocyanate groups and the second compound having at least two nucleophilic groups containing active hydrogen were polymerized in the dye-sensitized solar cell by the polyaddition reaction so that gelation was in situ performed, it is understood that the decrease in solar-energy conversion efficiency is small as compared to that of the dye-sensitized solar cell formed using the electrolyte solution and that hence a superior solar-energy conversion efficiency is obtained. The reason for this is believed that since the mixed solution is gelled while being in contact with the electrode surface, the chemical bonding condition at the electrochemical interface between the gel electrolyte and the electrode surface is improved and hence the resistance is decreased.

From the above results, it is understood that when the first compound having at least two isocyanate groups and the second compound having at least two nucleophilic groups containing active hydrogen are polymerized in the dye-sensitized solar cell by the polyaddition reaction, the electrolyte composition can be in situ gelled in the dye-sensitized solar cell so as to form the gel electrolyte. Accordingly, it is said that when the gel electrolyte described above is used, a dye-sensitized solar cell having superior solar-energy conversion efficiency can be realized.

Experiment 2

In Experiment 2, a photovoltaic device provided with an entire solid electrolyte of the present invention was investigated.

Example 6

In Example 6, a dye-sensitized solar cell was formed in the same manner as that in Example 1 except that the mixed solution was prepared as described below.

Preparation of Mixed Solution After 0.2 g of lithium iodide (LiI), 0.479 g of 1-propyl-2,3-dimethylimidazolium iodide, 0.0381 g of iodine ($I_2$), and 0.2 g of 4-tert-butylpyridine were dissolved in 3 g of polyoxyethylene glycerin (molecular weight of 1,200) used as the second compound having at least two nucleophilic groups containing active hydrogen, 100 ppm of dibutyl tin dilaurate was added as a catalyst.

Next, tolylene diisocyanate which was used as the first compound having at least two isocyanate groups was mixed with the above solution. The mixing ratio on a molar basis of the isocyanate group to the nucleophilic group containing active hydrogen was set to 1 to 1. Accordingly, the mixed solution was prepared.

Example 7

A dye-sensitized solar cell was formed in the same manner as that in Example 6 except that polyoxyethylene pentaerythritol (molecular weight of 1,600) was used as the second compound.

Example 8

A dye-sensitized solar cell was formed in the same manner as that in Example 6 except that hexamethylene diisocyanate was used as the first compound.

Example 9

A dye-sensitized solar cell was formed in the same manner as that in Example 6 except that isophorone diisocyanate was used as the first compound.

Example 10

A dye-sensitized solar cell was formed in the same manner as that in Example 6 except that glycerin was used as the second compound and that the catalyst was not used.

Comparative Example 9

A dye-sensitized solar cell was formed in the same manner as that in Example 6 except that the mixed solution was prepared by using polyethylene glycol triacrylate and by mixing 0.15 percent by weight of tert-butyl peroxypivalate as a radical polymerization initiator and that after injected, this mixed solution was allowed to stand at 60° C. for 1 hour.

Comparative Example 10

A dye-sensitized solar cell was formed in the same manner as that in Example 6 except that the mixed solution was prepared by using polyethylene glycol diacrylate and by mixing 0.15 percent by weight of tert-butyl peroxypivalate as a radical polymerization initiator and that after injected, this mixed solution was allowed to stand at 60° C. for 1 hour.

Comparative Example 11

A dye-sensitized solar cell was formed in the same manner as that in Example 6 except those described below. After the mixed solution was prepared in the same manner as that in Example 6, several droplets of the mixed solution were dripped onto the $TiO_2$ film which was the semiconductor layer, and a polyethylene terephthalate (PET) film was then provided thereon and was allowed to stand for 12 hours, thereby forming an entire solid electrolyte in a film shape. Subsequently, after solidification, the PET film was removed, and the counter electrode was then provided on the entire solid electrolyte, followed by sealing using a heat sealable film.

Comparative Example 12

A dye-sensitized solar cell was formed in the same manner as that in Example 7 except those described below. After the mixed solution was prepared in the same manner as that in Example 7, several droplets of the mixed solution were dripped onto the $TiO_2$ film which was the semiconductor layer, and a polyethylene terephthalate (PET) film was then provided thereon and was allowed to stand for 12 hours, thereby forming an entire solid electrolyte in a film shape. Subsequently, after solidification, the PET film was removed, and the counter electrode was then provided on the entire solid electrolyte, followed by sealing using a heat sealable film.

Comparative Example 13

A dye-sensitized solar cell was formed in the same manner as that in Example 8 except those described below. After the mixed solution was prepared in the same manner as that in Example 8, several droplets of the mixed solution were dripped onto the $TiO_2$ film which was the semiconductor layer, and a polyethylene terephthalate (PET) film was then provided thereon and was allowed to stand for 12 hours, thereby forming an entire solid electrolyte in a film shape. Subsequently, after solidification, the PET film was removed, and the counter electrode was then provided on the entire solid electrolyte, followed by sealing using a heat sealable film.

Comparative Example 14

A dye-sensitized solar cell was formed in the same manner as that in Example 9 except those described below. After the mixed solution was prepared in the same manner as that in Example 9, several droplets of the mixed solution were dripped onto the $TiO_2$ film which was the semiconductor layer, and a polyethylene terephthalate (PET) film was then provided thereon and was allowed to stand for 12 hours, thereby forming an entire solid electrolyte in a film shape. Subsequently, after solidification, the PET film was removed, and the counter electrode was then provided on the entire solid electrolyte, followed by sealing using a heat sealable film.

Comparative Example 15

A dye-sensitized solar cell was formed in the same manner as that in Example 10 except those described below. After the mixed solution was prepared in the same manner as that in Example 10, several droplets of the mixed solution were dripped onto the $TiO_2$ film which was the semiconductor layer, and a polyethylene terephthalate (PET) film was then provided thereon and was allowed to stand for 12 hours, thereby forming an entire solid electrolyte in a film shape. Subsequently, after solidification, the PET film was removed, and the counter electrode was then provided on the entire solid electrolyte, followed by sealing using a heat sealable film.

The preparation conditions of the mixed solutions according to the examples and comparative examples described above are shown in Table 3.

TABLE 3

| | First compound | Second compound | Catalyst |
|---|---|---|---|
| Example 6 | tolylene 2,4-diisocyanate | polyoxyethylene glycerin (molecular weight of 1,200) | dibutyl tin dilaurate |
| Example 7 | tolylene 2,4-diisocyanate | polyoxyethylene pentaerythritol (molecular weight of 1,600) | dibutyl tin dilaurate |
| Example 8 | hexamethylene diisocyanate | polyoxyethylene glycerin (molecular weight of 1,200) | dibutyl tin dilaurate |
| Example 9 | isophorone diisocyanate | polyoxyethylene glycerin (molecular weight of 1,200) | dibutyl tin dilaurate |
| Example 10 | tolylene 2,4-diisocyanate | glycerin | No addition |
| Comparative example 9 | polyethylene glycol triacrylate | — | tert-butyl peroxypivalate |
| Comparative example 10 | polyethylene glycol diacrylate | — | tert-butyl peroxypivalate |
| Comparative example 11 | tolylene 2,4-diisocyanate | polyoxyethylene glycerin (molecular weight of 1,200) | dibutyl tin dilaurate |
| Comparative example 12 | tolylene 2,4-diisocyanate | polyoxyethylene pentaerythritol (molecular weight of 1,600) | dibutyl tin dilaurate |
| Comparative example 13 | hexamethylene diisocyanate | polyoxyethylene glycerin (molecular weight of 1,200) | dibutyl tin dilaurate |
| Comparative example 14 | isophorone diisocyanate | polyoxyethylene glycerin (molecular weight of 1,200) | dibutyl tin dilaurate |
| Comparative example 15 | tolylene 2,4-diisocyanate | glycerin | No addition |

Solar-energy conversion efficiencies of the dye-sensitized solar cells of Examples 6 to 10 and Comparative Examples 9 to 15 formed as described above were evaluated in the same manner as that described above. The results are shown in Table 4.

TABLE 4

|  | Gelation | Solar-energy conversion efficiency (%) |
| --- | --- | --- |
| Example 6 | ○ | 1.5 |
| Example 7 | ○ | 1.4 |
| Example 8 | ○ | 1.5 |
| Example 9 | ○ | 1.3 |
| Example 10 | ○ | 1.0 |
| Comparative example 9 | X | 0.5*[2] |
| Comparative example 10 | X | 0.5*[2] |
| Comparative example 11 | ○ | 0.7 |
| Comparative example 12 | ○ | 0.7 |
| Comparative example 13 | ○ | 0.7 |
| Comparative example 14 | ○ | 0.6 |
| Comparative example 15 | ○ | 0.5 |

*[2]indicates a reference value since no gelation occurred.

In addition, the individual dye-sensitized solar cells were each decomposed after the measurement of the solar-energy conversion efficiency so that an electrolyte portion provided inside the solar cell was recovered, and the entire solidification of the electrolyte was confirmed by visual inspection. The results are also shown in Table 4. In Table 4, ○ indicates that entire solidification occurred, and x indicates that entire solidification did not occur.

As can be seen from Table 4, in Comparative Examples 9 and 10 in which a conventional radical polymerization method was used, it is understood that the entire solidification of the electrolyte composition does not in situ occur in the dye-sensitized solar cell. On the other hand, in Examples 6 to 10 in which the first compound having at least two isocyanate groups and the second compound having at least two nucleophilic groups containing active hydrogen were polymerized by the polyaddition reaction, it is understood that the electrolyte composition is in situ and entirely solidified in the dye-sensitized solar cell and that the entire solid electrolyte is obtained.

From the above results, it is understood that when the first compound having at least two isocyanate groups and the second compound having at least two nucleophilic groups containing active hydrogen are polymerized by the polyaddition reaction, the electrolyte composition can be in situ and entirely solidified in the dye-sensitized solar cell and that the entire solid electrolyte can be obtained.

In addition, as can be seen from Table 4, in Examples 6 to 10 according to the present invention in which the first compound having at least two isocyanate groups and the second compound having at least two nucleophilic groups containing active hydrogen were polymerized in the dye-sensitized solar cell by the polyaddition reaction so that the entire solidification was in situ performed, it is understood that a high solar-energy conversion efficiency can be obtained as compared to that obtained in Comparative Examples 11 to 15 in which the dye-sensitized solar cell was formed by the steps of forming the entire solid electrolyte beforehand on the semiconductor layer, and providing the counter electrode on the entire solid electrolyte.

The reason the solar-energy conversion efficiency is high is believed that, in Examples 6 to 10, since the mixed solution is entirely solidified while being in contact with the electrode surface, the chemical bonding condition at the electrochemical interface between the entire solid electrolyte and the electrode surface is improved and hence the resistance is decreased. On the other hand, the reason the solar-energy conversion efficiency is low is believed that, in Comparative Examples 11 to 15, since the chemical bonding condition at the electrochemical interface between the electrode surface and the entire solid electrolyte which is entirely solidified beforehand is not satisfactory, the resistance is increased.

From the above results, it is understood that when the first compound having at least two isocyanate groups and the second compound having at least two nucleophilic groups containing active hydrogen are polymerized in the dye-sensitized solar cell by the polyaddition reaction, the electrolyte composition can be in situ and entirely solidified in the dye-sensitized solar cell so as to form the entire solid electrolyte. Accordingly, it is said that when the entire solid electrolyte described above is used, a dye-sensitized solar cell having superior solar-energy conversion efficiency can be realized.

Experiment 3

In Experiment 3, a photovoltaic device provided with another gel electrolyte of the present invention was investigated.

Example 21

In Example 21, a dye-sensitized solar cell was formed in the same manner as that in Example 1 except that the mixed solution was prepared as described below to form a gel electrolyte.

First, in 1-ethyl-3-methylimidazolium (hereinafter referred to as "EMI" in some cases)—bis(trifluoromethanesulfonyl)imide (TFSI), 0.9 M of 1-propyl-2,3-dimethylimidazolium iodide, 30 mM of iodine ($I_2$), and 0.5 M of 4-tert-butylpyridine were dissolved, so that an ionic liquid containing a redox couple was prepared.

Next, after 100 ppm of catalyst, dibutyl tin dilaurate, was added to the ionic liquid, polyoxyethylene glycerin (molecular weight of 1,200) was mixed therewith as the second compound having at least two nucleophilic groups containing active hydrogen, and tolylene diisocyanate was further mixed as the first compound having at least two isocyanate groups, thereby preparing the mixed solution. The mixing ratio on a molar basis of the isocyanate group to the nucleophilic group containing active hydrogen was set to 1 to 1, and the polyoxyethylene glycerin and the tolylene diisocyanate were mixed so that the total thereof is 6 percent by weight with respect to the ionic liquid.

After several droplets of the mixed solution were dripped in the inlet opening of the device assembled beforehand, by evacuation at a temperature of 50° C., the mixed solution was injected into the device, and subsequently, the inlet opening was sealed with a heat sealable film and a glass plate. After the injection of the mixed solution, this device was allowed to stand for 12 hours at room temperature, and hence a dye-sensitized solar cell provided with a gel electrolyte was obtained, the gel electrolyte being formed by gelation of the ionic liquid containing a redox couple.

Example 22

A dye-sensitized solar cell was formed in the same manner as that in Example 21 except that polyoxyethylene pentaerythritol (molecular weight of 1,600) was used as the second compound.

Example 23

A dye-sensitized solar cell was formed in the same manner as that in Example 21 except that hexamethylene diisocyanate was used as the first compound.

Example 24

A dye-sensitized solar cell was formed in the same manner as that in Example 21 except that isophorone diisocyanate was used as the first compound.

Example 25

A dye-sensitized solar cell was formed in the same manner as that in Example 21 except that glycerin was used as the second compound and that the catalyst was not used.

Example 26

A dye-sensitized solar cell was formed in the same manner as that in Example 21 except that EMI-iodide was used for the ionic liquid, and 30 mM of iodine ($I_2$) as a redox seed and 0.5 M of 4-tert-butylpyridine were dissolved so that an ionic liquid containing a redox couple was prepared.

Example 27

A dye-sensitized solar cell was formed in the same manner as that in Example 26 except that polyoxyethylene pentaerythritol (molecular weight of 1,600) was used as the second compound.

Example 28

A dye-sensitized solar cell was formed in the same manner as that in Example 26 except that hexamethylene diisocyanate was used as the first compound.

Example 29

A dye-sensitized solar cell was formed in the same manner as that in Example 26 except that isophorone diisocyanate was used as the first compound.

Example 30

A dye-sensitized solar cell was formed in the same manner as that in Example 26 except that glycerin was used as the second compound and that the catalyst was not used.

Comparative Example 21

A dye-sensitized solar cell was formed in the same manner as that in Example 21 except that the first compound, the second compound, and the catalyst were not mixed with the ionic liquid.

Comparative Example 22

A dye-sensitized solar cell was formed in the same manner as that in Example 26 except that the first compound, the second compound, and the catalyst were not mixed with the ionic liquid.

Comparative Example 23

A dye-sensitized solar cell was formed in the same manner as that in Example 21 except that the mixed solution was prepared by mixing 6 percent by weight of polyethylene glycol triacrylate and 0.15 percent by weight of tert-butyl peroxypivalate as a radical polymerization initiator with respect to the ionic liquid of Example 21 and that after injected, this mixed solution was allowed to stand at 60° C. for 1 hour.

Comparative Example 24

A dye-sensitized solar cell was formed in the same manner as that in Example 21 except that the mixed solution was prepared by mixing 6 percent by weight of polyethylene glycol diacrylate and 0.15 percent by weight of tert-butyl peroxypivalate as a radical polymerization initiator with respect to the ionic liquid of Example 21 and that after injected, this mixed solution was allowed to stand at 60° C. for 1 hour.

Comparative Example 25

A dye-sensitized solar cell was formed in the same manner as that in Example 26 except that the mixed solution was prepared by mixing 6 percent by weight of polyethylene glycol triacrylate and 0.15 percent by weight of tert-butyl peroxypivalate as a radical polymerization initiator with respect to the ionic liquid of Example 26 and that after injected, this mixed solution was allowed to stand at 60° C. for 1 hour.

Comparative Example 26

A dye-sensitized solar cell was formed in the same manner as that in Example 26 except that the mixed solution was prepared by mixing 6 percent by weight of polyethylene glycol diacrylate and 0.15 percent by weight of tert-butyl peroxypivalate as a radical polymerization initiator with respect to the ionic liquid of Example 26 and that after injected, this mixed solution was allowed to stand at 60° C. for 1 hour.

Comparative Example 27

A dye-sensitized solar cell was formed in the same manner as that in Example 21 except those described below. After the mixed solution was prepared in the same manner as that in Example 21, several droplets of the mixed solution were dripped onto the $TiO_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was provided on the gel electrolyte layer, followed by sealing using a heat sealable film.

Comparative Example 28

A dye-sensitized solar cell was formed in the same manner as that in Example 22 except those described below. After the mixed solution was prepared in the same manner as that in Example 22, several droplets of the mixed solution were dripped onto the TiO$_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was provided on the gel electrolyte layer, followed by sealing using a heat sealable film.

Comparative Example 29

A dye-sensitized solar cell was formed in the same manner as that in Example 23 except those described below. After the mixed solution was prepared in the same manner as that in Example 23, several droplets of the mixed solution were dripped onto the TiO$_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was provided on the gel electrolyte layer, followed by sealing using a heat sealable film.

Comparative Example 30

A dye-sensitized solar cell was formed in the same manner as that in Example 24 except those described below. After the mixed solution was prepared in the same manner as that in Example 24, several droplets of the mixed solution were dripped onto the TiO$_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was provided on the gel electrolyte layer, followed by sealing using a heat sealable film.

Comparative Example 31

A dye-sensitized solar cell was formed in the same manner as that in Example 25 except those described below. After the mixed solution was prepared in the same manner as that in Example 25, several droplets of the mixed solution were dripped onto the TiO$_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was provided on the gel electrolyte layer, followed by sealing using a heat sealable film.

Comparative Example 32

A dye-sensitized solar cell was formed in the same manner as that in Example 26 except those described below. After the mixed solution was prepared in the same manner as that in Example 26, several droplets of the mixed solution were dripped onto the TiO$_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was provided on the gel electrolyte layer, followed by sealing using a heat sealable film.

Comparative Example 33

A dye-sensitized solar cell was formed in the same manner as that in Example 27 except those described below. After the mixed solution was prepared in the same manner as that in Example 27, several droplets of the mixed solution were dripped onto the TiO$_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was provided on the gel electrolyte layer, followed by sealing using a heat sealable film.

Comparative Example 34

A dye-sensitized solar cell was formed in the same manner as that in Example 28 except those described below. After the mixed solution was prepared in the same manner as that in Example 28, several droplets of the mixed solution were dripped onto the TiO$_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was provided on the gel electrolyte layer, followed by sealing using a heat sealable film.

Comparative Example 35

A dye-sensitized solar cell was formed in the same manner as that in Example 29 except those described below. After the mixed solution was prepared in the same manner as that in Example 29, several droplets of the mixed solution were dripped onto the TiO$_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was provided on the gel electrolyte layer, followed by sealing using a heat sealable film.

Comparative Example 36

A dye-sensitized solar cell was formed in the same manner as that in Example 30 except those described below. After the mixed solution was prepared in the same manner as that in Example 30, several droplets of the mixed solution were dripped onto the TiO$_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was provided on the gel electrolyte layer, followed by sealing using a heat sealable film.

The preparation conditions of the mixed solutions according to the examples and comparative examples described above are shown in Table 5.

TABLE 5

|  | First compound | Second compound | Catalyst |
| --- | --- | --- | --- |
| Example 21 | tolylene 2,4-diisocyanate | polyoxyethylene glycerin (molecular weight of 1,200) | dibutyl tin dilaurate |

TABLE 5-continued

|  | First compound | Second compound | Catalyst |
|---|---|---|---|
| Example 22 | tolylene 2,4-diisocyanate | polyoxyethylene pentaerythritol (molecular weight of 1,600) | dibutyl tin dilaurate |
| Example 23 | hexamethylene diisocyanate | polyoxyethylene glycerin (molecular weight of 1,200) | dibutyl tin dilaurate |
| Example 24 | isophorone diisocyanate | polyoxyethylene glycerin (molecular weight of 1,200) | dibutyl tin dilaurate |
| Example 25 | tolylene 2,4-diisocyanate | glycerin | No addition |
| Example 26 | tolylene 2,4-diisocyanate | polyoxyethylene glycerin (molecular weight of 1,200) | dibutyl tin dilaurate |
| Example 27 | tolylene 2,4-diisocyanate | polyoxyethylene pentaerythritol (molecular weight of 1,600) | dibutyl tin dilaurate |
| Example 28 | hexamethylene diisocyanate | polyoxyethylene glycerin (molecular weight of 1.200) | dibutyl tin dilaurate |
| Example 29 | isophorone diisocyanate | polyoxyethylene glycerin (molecular weight of 1,200) | dibutyl tin dilaurate |
| Example 30 | tolylene 2,4-diisocyanate | glycerin | No addition |
| Comparative example 21 | No addition | No addition | No addition |
| Comparative example 22 | No addition | No addition | No addition |
| Comparative example 23 | polyethylene glycol triacrylate | — | tert-butyl peroxypivalate |
| Comparative example 24 | polyethylene glycol diacrylate | — | tert-butyl peroxypivalate |
| Comparative example 25 | polyethylene glycol triacrylate | — | tert-butyl peroxypivalate |
| Comparative example 26 | polyethylene glycol diacrylate | — | tert-butyl peroxypivalate |
| Example 27 | tolylene 2,4-diisocyanate | polyoxyethylene glycerin (molecular weight of 1,200) | dibutyl tin dilaurate |
| Example 28 | tolylene 2,4-diisocyanate | polyoxyethylene pentaerythritol (molecular weight of 1,600) | dibutyl tin dilaurate |
| Example 29 | hexamethylene diisocyanate | polyoxyethylene glycerin (molecular weight of 1,200) | dibutyl tin dilaurate |
| Example 30 | isophorone diisocyanate | polyoxyethylene glycerin (molecular weight of 1,200) | dibutyl tin dilaurate |
| Comparative example 31 | tolylene 2,4-diisocyanate | glycerin | No addition |
| Comparative example 32 | tolylene 2,4-diisocyanate | polyoxyethylene glycerin (molecular weight of 1,200) | dibutyl tin dilaurate |
| Example 33 | tolylene 2,4-diisocyanate | polyoxyethylene pentaerythritol (molecular weight of 1,600) | dibutyl tin dilaurate |
| Example 34 | hexamethylene diisocyanate | polyoxyethylene glycerin (molecular weight of 1,200) | dibutyl tin dilaurate |
| Example 35 | isophorone diisocyanate | polyoxyethylene glycerin (molecular weight of 1,200) | dibutyl tin dilaurate |
| Example 36 | tolylene 2,4-diisocyanate | glycerin | No addition |

Solar-energy conversion efficiencies of the dye-sensitized solar cells of Examples 21 to 30 and Comparative Examples 21 to 36 formed as described above were evaluated in the same manner as that described above. The results are shown in Table 6.

TABLE 6

|  | Gelation | Solar-energy conversion efficiency (%) |
|---|---|---|
| Example 21 | ○ | 1.3 |
| Example 22 | ○ | 1.4 |
| Example 23 | ○ | 1.3 |
| Example 24 | ○ | 1.2 |
| Example 25 | ○ | 1.0 |
| Example 26 | ○ | 1.3 |
| Example 27 | ○ | 1.3 |
| Example 28 | ○ | 1.2 |
| Example 29 | ○ | 1.2 |
| Example 30 | ○ | 0.9 |
| Comparative example 21 | X | 1.5[*3] |
| Comparative example 22 | X | 1.3[*3] |
| Comparative example 23 | X | 0.7[*3] |
| Comparative example 24 | X | 0.6[*3] |
| Comparative example 25 | X | 0.4[*3] |
| Comparative example 26 | X | 0.4[*3] |
| Comparative example 27 | ○ | 0.8 |
| Comparative example 28 | ○ | 0.8 |
| Comparative example 29 | ○ | 0.7 |
| Comparative example 30 | ○ | 0.7 |

TABLE 6-continued

| | Gelation | Solar-energy conversion efficiency (%) |
|---|---|---|
| Comparative example 31 | ○ | 0.5 |
| Comparative example 32 | ○ | 0.7 |
| Comparative example 33 | ○ | 0.7 |
| Comparative example 34 | ○ | 0.6 |
| Comparative example 35 | ○ | 0.6 |
| Comparative example 36 | ○ | 0.5 |

*³indicates a reference value since no gelation occurred.

In addition, the individual dye-sensitized solar cells were each decomposed after the measurement of the solar-energy conversion efficiency so that an electrolyte portion provided inside the solar cell was recovered, and the gelation of the electrolyte was confirmed by visual inspection. The results are also shown in Table 6. In Table 6, ○ indicates that gelation occurred, and x indicates that gelation did not occur.

As can be seen from Table 6, in Comparative Examples 23 to 26 in which a conventional radical polymerization method was used, it is understood that the ionic liquid containing a redox couple is not in situ gelled in the dye-sensitized solar cell. On the other hand, in Examples 21 to 30 in which the first compound having at least two isocyanate groups and the second compound having at least two nucleophilic groups containing active hydrogen were polymerized by the polyaddition reaction, it is understood that the ionic liquid containing a redox couple is in situ gelled in the dye-sensitized solar cell and that the gel electrolyte is obtained.

From the above results, it is understood that when the first compound having at least two isocyanate groups and the second compound having at least two nucleophilic groups containing active hydrogen are polymerized by the polyaddition reaction, the ionic liquid containing a redox couple can be in situ gelled in the dye-sensitized solar cell and that the gel electrolyte is obtained.

In addition, when Examples 21 to 30 are compared to Comparative Examples 21 and 22, since the decrease in solar-energy conversion efficiency of the dye-sensitized solar cell having the gel electrolyte of the present invention is small as compared to that of the dye-sensitized solar cell formed of the ionic liquid containing a redox couple, it is said that a superior dye-sensitized solar cell having a superior solar-energy conversion efficiency is realized.

In addition, as can be seen from Table 6, in Comparative Examples 27 to 36 in which the gel electrolyte was formed beforehand on the semiconductor layer by polymerizing the first compound having at least two isocyanate groups and the second compound having at least two nucleophilic groups containing active hydrogen in accordance with the polyaddition reaction and in which the dye-sensitized solar cell was formed by providing the counter electrode on the gel electrolyte thus formed, it is understood that although the gel electrolyte is obtained, compared to the dye-sensitized solar cell formed using the ionic liquid containing a redox couple, the solar-energy conversion efficiency is very much decreased. The reason for this is believed that since the chemical bonding condition at the electrochemical interface between the gel electrolyte which is formed beforehand by gelation and the electrode surface is not satisfactory, the resistance is increased.

On the other hand, in Examples 21 to 30 according to the present invention in which the first compound having at least two isocyanate groups and the second compound having at least two nucleophilic groups containing active hydrogen were polymerized in the dye-sensitized solar cell by the polyaddition reaction so that gelation was in situ performed, it is understood that the decrease in solar-energy conversion efficiency is small as compared to that of the dye-sensitized solar cell formed of the ionic liquid containing a redox couple and that hence a superior solar-energy conversion efficiency is obtained. The reason for this is believed that since the mixed solution is gelled while being in contact with the electrode surface, the chemical bonding condition at the electrochemical interface between the gel electrolyte and the electrode surface is improved and hence the resistance is decreased.

From the above results, it is understood that when the first compound having at least two isocyanate groups and the second compound having at least two nucleophilic groups containing active hydrogen are polymerized in the dye-sensitized solar cell by the polyaddition reaction, the ionic liquid containing a redox couple can be in situ gelled in the dye-sensitized solar cell so as to form the gel electrolyte. Accordingly, it is said that when the gel electrolyte described above is used, a dye-sensitized solar cell having superior solar-energy conversion efficiency can be realized.

Experiment 4

In Experiment 4, a photovoltaic device provided with another gel electrolyte of the present invention was investigated.

Example 41

In Example 41, a dye-sensitized solar cell was formed in the same manner as that in Example 1 except that the mixed solution was prepared as described below.

In 3 g of a solvent composed of ethylene carbonate and propylene carbonate at a mixing ratio of 1 to 1 on a weight basis, 0.2 g of lithium iodide (LiI), 0.479 g of 1-propyl-2,3-dimethylimidazolium iodide, 0.0381 g of iodine ($I_2$), and 0.2 g of 4-tert-butylpyridine were dissolved, so that an electrolyte solution which was an electrolyte composition was prepared.

Next, polyethylene glycol triacrylate (molecular weight of 3,000) as the first compound having at least two unsaturated double bonds was mixed with the electrolyte solution, and 4,4'-trimethylenedipiperidine was further mixed as the second compound having at least two nucleophilic groups containing active hydrogen, thereby preparing the mixed solution. The mixing ratio on a molar basis of the unsaturated double bond to the nucleophilic group containing active hydrogen was set to 1 to 1, and the polyethylene glycol triacrylate and the 4,4'-trimethylenedipiperidine were mixed so that the total thereof was 6 percent by weight to the electrolyte solution.

After several droplets of the mixed solution were dripped in the inlet opening of the device assembled beforehand, evacuation was performed so that the mixed solution was injected into the device, and subsequently, the inlet opening was sealed with a heat sealable film and a glass plate. After the injection, this device was allowed to stand for 12 hours at room temperature, and hence a dye-sensitized solar cell provided with a gel electrolyte was obtained, the gel electrolyte being formed by gelation of the electrolyte solution.

Example 42

A dye-sensitized solar cell was formed in the same manner as that in Example 41 except that polyethylene glycol diacrylate was used as the first compound and that polyethylene glycol tripiperidine was used as the second compound.

Example 43

A dye-sensitized solar cell was formed in the same manner as that in Example 41 except that polyethylene glycol tripiperidine was used as the second compound.

Example 44

A dye-sensitized solar cell was formed in the same manner as that in Example 41 except that polyethylene glycol triamine was used as the second compound.

Example 45

A dye-sensitized solar cell was formed in the same manner as that in Example 41 except that polyethyleneimine (molecular weight of 600) was used as the second compound.

Comparative Example 41

A dye-sensitized solar cell was formed in the same manner as that in Example 41 except that the first compound and the second compound were not mixed with the electrolyte solution which was the electrolyte composition and that a liquid electrolyte composition was used as the electrolyte layer.

Comparative Example 42

A dye-sensitized solar cell was formed in the same manner as that in Example 41 except that the mixed solution was prepared by mixing polyethylene glycol triacrylate as the first compound so as to be 6 percent by weight with respect to the electrolyte solution and by mixing 0.15 percent by weight of tert-butyl peroxypivalate as a radical polymerization initiator without the second compound and that after injected, this mixed solution was allowed to stand at 60° C. for 1 hour.

Comparative Example 43

A dye-sensitized solar cell was formed in the same manner as that in Example 41 except that the mixed solution was prepared by mixing polyethylene glycol diacrylate as the first compound so as to be 6 percent by weight with respect to the electrolyte solution and by mixing 0.15 percent by weight of tert-butyl peroxypivalate as a radical polymerization initiator without the second compound and that after injected, this mixed solution was allowed to stand at 60° C. for 1 hour.

Comparative Example 44

A dye-sensitized solar cell was formed in the same manner as that in Example 41 except those described below. After the mixed solution was prepared in the same manner as that in Example 41, several droplets of the mixed solution were dripped onto the $TiO_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was then provided on the gel electrolyte layer, followed by sealing using a heat sealable film.

Comparative Example 45

A dye-sensitized solar cell was formed in the same manner as that in Example 42 except those described below. After the mixed solution was prepared in the same manner as that in Example 42, several droplets of the mixed solution were dripped onto the $TiO_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was then provided on the gel electrolyte layer, followed by sealing using a heat sealable film.

Comparative Example 46

A dye-sensitized solar cell was formed in the same manner as that in Example 43 except those described below. After the mixed solution was prepared in the same manner as that in Example 43, several droplets of the mixed solution were dripped onto the $TiO_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was then provided on the gel electrolyte layer, followed by sealing using a heat sealable film.

Comparative Example 47

A dye-sensitized solar cell was formed in the same manner as that in Example 44 except those described below. After the mixed solution was prepared in the same manner as that in Example 44, several droplets of the mixed solution were dripped onto the $TiO_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was then provided on the gel electrolyte layer, followed by sealing using a heat sealable film.

Comparative Example 48

A dye-sensitized solar cell was formed in the same manner as that in Example 45 except those described below. After the mixed solution was prepared in the same manner as that in Example 45, several droplets of the mixed solution were dripped onto the $TiO_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was then provided on the gel electrolyte layer, followed by sealing using a heat sealable film.

The preparation conditions of the mixed solutions according to the examples and comparative examples described above are shown in Table 7.

TABLE 7

|  | First compound | Second compound |
| --- | --- | --- |
| Example 41 | polyethylene glycol triacrylate | 4,4'-trimethylenedipiperidine |
| Example 42 | polyethylene glycol diacrylate | polyethylene glycol tripiperidine |
| Example 43 | polyethylene glycol triacrylate | polyethylene glycol tripiperidine |
| Example 44 | polyethylene glycol triacrylate | polyethylene glycol triamine |
| Example 45 | polyethylene glycol triacrylate | polyethyleneimine (molecular weight of 600) |
| Comparative example 41 | No addition | No addition |
| Comparative example 42 | polyethylene glycol triacrylate | — |
| Comparative example 43 | polyethylene glycol diacrylate | — |
| Comparative example 44 | polyethylene glycol triacrylate | 4,4'-trimethylenedipiperidine |
| Comparative example 45 | polyethylene glycol diacrylate | polyethylene glycol tripiperidine |
| Comparative example 46 | polyethylene glycol triacrylate | polyethylene glycol tripiperidine |
| Comparative example 47 | polyethylene glycol triacrylate | polyethylene glycol triamine |
| Comparative example 48 | polyethylene glycol triacrylate | polyethyleneimine (molecular weight of 600) |

Solar-energy conversion efficiencies of the dye-sensitized solar cells of Examples 41 to 45 and Comparative Examples 41 to 48 formed as described above were evaluated in the same manner as that described above. The results are shown in Table 8.

TABLE 8

|  | Gelation | Solar-energy conversion efficiency (%) |
| --- | --- | --- |
| Example 41 | ○ | 7.8 |
| Example 42 | ○ | 7.9 |
| Example 43 | ○ | 8.0 |
| Example 44 | ○ | 8.0 |
| Example 45 | ○ | 7.8 |
| Comparative example 41 | — | 8.2 |
| Comparative example 42 | X | 4.5*[4] |
| Comparative example 43 | X | 4.7*[4] |
| Comparative example 44 | ○ | 5.8 |
| Comparative example 45 | ○ | 5.7 |
| Comparative example 46 | ○ | 5.9 |
| Comparative example 47 | ○ | 5.9 |
| Comparative example 48 | ○ | 5.6 |

*[4]indicates a reference value since no gelation occurred.

In addition, the individual dye-sensitized solar cells were each decomposed after the measurement of the solar-energy conversion efficiency so that an electrolyte portion provided inside the solar cell was recovered, and the gelation of the electrolyte was confirmed by visual inspection. The results are also shown in Table 8. In Table 8, ○ indicates that gelation occurred, and x indicates that gelation did not occur.

As can be seen from Table 8, in Comparative Examples 42 and 43 in which a conventional radical polymerization method was used, it is understood that the electrolyte composition is not in situ gelled in the dye-sensitized solar cell. On the other hand, in Examples 41 to 45 in which the first compound having at least two unsaturated double bonds and the second compound having at least two nucleophilic groups containing active hydrogen were polymerized by the Michael addition reaction, it is understood that the electrolyte composition is in situ gelled in the dye-sensitized solar cell and that the gel electrolyte is obtained.

From the above results, it is understood that when the first compound having at least two unsaturated double bonds and the second compound having at least two nucleophilic groups containing active hydrogen are polymerized by the Michael addition reaction, the electrolyte composition can be in situ gelled in the dye-sensitized solar cell and that the gel electrolyte is obtained.

In addition, when Examples 41 to 45 are compared to Comparative Example 41, since the decrease in solar-energy conversion efficiency of the dye-sensitized solar cell having the gel electrolyte of the present invention is small as compared to that of the dye-sensitized solar cell formed of the liquid electrolyte composition, that is, the electrolyte solution, it is said that a superior dye-sensitized solar cell having a superior solar-energy conversion efficiency is realized.

In addition, as can be seen from Table 8, in Comparative Examples 44 to 48 in which the gel electrolyte was formed beforehand on the semiconductor layer by polymerizing the first compound having at least two unsaturated double bonds and the second compound having at least two nucleophilic groups containing active hydrogen in accordance with the Michael addition reaction and in which the dye-sensitized solar cell was formed by providing the counter electrode on the gel electrolyte thus formed, it is understood that although the gel electrolyte is obtained, compared to the dye-sensitized solar cell formed using the liquid electrolyte composition, that is, the electrolyte solution, the solar-energy conversion efficiency is very much decreased. The reason for this is believed that since the chemical bonding condition at the electrochemical interface between the gel electrolyte which is formed beforehand by gelation and the electrode surface is not satisfactory, the resistance is increased.

On the other hand, in Examples 41 to 45 according to the present invention in which the first compound having at least two unsaturated double bonds and the second compound having at least two nucleophilic groups containing active hydrogen were polymerized in the dye-sensitized solar cell by the Michael addition reaction so that gelation was in situ performed, it is understood that the decrease in solar-energy conversion efficiency is small as compared to that of the dye-sensitized solar cell formed using the liquid electrolyte, that is, the electrolyte solution, and that hence a superior solar-energy conversion efficiency is obtained. The reason for this is believed that since the mixed solution is gelled while being in contact with the electrode surface, the chemical bonding condition at the electrochemical interface between the gel electrolyte and the electrode surface is improved and hence the resistance is decreased.

From the above results, it is understood that when the first compound having at least two unsaturated double bonds and the second compound having at least two nucleophilic groups containing active hydrogen are polymerized in the dye-sensitized solar cell by the Michael addition reaction, the electrolyte composition can be in situ gelled in the dye-sensitized solar cell so as to form the gel electrolyte. Accordingly, it is said that when the gel electrolyte described above is used, a dye-sensitized solar cell having superior solar-energy conversion efficiency can be realized.

Experiment 5

In Experiment 5, a photovoltaic device provided with another entire solid electrolyte of the present invention was investigated.

Example 46

In Example 46, a dye-sensitized solar cell was formed in the same manner as that in Example 41 except that the mixed solution was prepared as described below.

In 3 g of polyethylene glycol triacrylate (molecular weight of 3,000) used as the first compound having at least two unsaturated double bonds, 0.2 g of lithium iodide (LiI), 0.479 g of 1-propyl-2,3-dimethylimidazolium iodide, 0.0381 g of iodine ($I_2$), and 0.2 g of 4-tert-butylpyridine were dissolved.

Next, 4,4'-trimethylenedipiperidine was mixed which was used as the second compound having at least two nucleophilic groups containing active hydrogen. The mixing ratio on a molar basis of the unsaturated double bond to the nucleophilic group containing active hydrogen was set to 1 to 1. Accordingly, the mixed solution was prepared.

Example 47

A dye-sensitized solar cell was formed in the same manner as that in Example 46 except that polyethylene glycol diacrylate was used as the first compound and that polyethylene glycol tripiperidine was used as the second compound.

Example 48

A dye-sensitized solar cell was formed in the same manner as that in Example 46 except that polyethylene glycol tripiperidine was used as the second compound.

Example 49

A dye-sensitized solar cell was formed in the same manner as that in Example 46 except that polyethylene glycol triamine was used as the second compound.

Example 50

A dye-sensitized solar cell was formed in the same manner as that in Example 46 except that polyethyleneimine (molecular weight of 600) was used as the second compound.

Comparative Example 49

A dye-sensitized solar cell was formed in the same manner as that in Example 46 except that the mixed solution was prepared by mixing polyethylene glycol triacrylate as the first compound so as to be 6 percent by weight with respect to the electrolyte composition and by mixing 0.15 percent by weight of tert-butyl peroxypivalate as a radical polymerization initiator without the second compound and that after injected, this mixed solution was allowed to stand at 60° C. for 1 hour.

Comparative Example 50

A dye-sensitized solar cell was formed in the same manner as that in Example 46 except that the mixed solution was prepared by mixing polyethylene glycol diacrylate as the first compound so as to be 6 percent by weight with respect to the electrolyte composition and by mixing 0.15 percent by weight of tert-butyl peroxypivalate as a radical polymerization initiator without the second compound and that after injected, this mixed solution was allowed to stand at 60° C. for 1 hour.

Comparative Example 51

A dye-sensitized solar cell was formed in the same manner as that in Example 46 except those described below. After the mixed solution was prepared in the same manner as that in Example 46, several droplets of the mixed solution were dripped onto the $TiO_2$ film which was the semiconductor layer, and a polyethylene terephthalate (PET) film was then provided thereon and was allowed to stand for 12 hours, thereby forming an entire solid electrolyte in a film shape. Subsequently, after the solidification, the PET film was removed, and the counter electrode was provided on the entire solid electrolyte, followed by sealing using a heat sealable film.

Comparative Example 52

A dye-sensitized solar cell was formed in the same manner as that in Example 47 except those described below. After the mixed solution was prepared in the same manner as that in Example 47, several droplets of the mixed solution were dripped onto the $TiO_2$ film which was the semiconductor layer, and a polyethylene terephthalate (PET) film was then provided thereon and was allowed to stand for 12 hours, thereby forming an entire solid electrolyte in a film shape. Subsequently, after the solidification, the PET film was removed, and the counter electrode was provided on the entire solid electrolyte, followed by sealing using a heat sealable film.

Comparative Example 53

A dye-sensitized solar cell was formed in the same manner as that in Example 48 except those described below. After the mixed solution was prepared in the same manner as that in Example 48, several droplets of the mixed solution were dripped onto the $TiO_2$ film which was the semiconductor layer, and a polyethylene terephthalate (PET) film was then provided thereon and was allowed to stand for 12 hours, thereby forming an entire solid electrolyte in a film shape. Subsequently, after the solidification, the PET film was removed, and the counter electrode was provided on the entire solid electrolyte, followed by sealing using a heat sealable film.

Comparative Example 54

A dye-sensitized solar cell was formed in the same manner as that in Example 49 except those described below. After the mixed solution was prepared in the same manner as that in Example 49, several droplets of the mixed solution were dripped onto the $TiO_2$ film which was the semiconductor layer, and a polyethylene terephthalate (PET) film was then provided thereon and was allowed to stand for 12 hours, thereby forming an entire solid electrolyte in a film shape. Subsequently, after the solidification, the PET film was removed, and the counter electrode was provided on the entire solid electrolyte, followed by sealing using a heat sealable film.

Comparative Example 55

A dye-sensitized solar cell was formed in the same manner as that in Example 50 except those described below. After the mixed solution was prepared in the same manner as that in Example 50, several droplets of the mixed solution were dripped onto the $TiO_2$ film which was the semiconductor layer, and a polyethylene terephthalate (PET) film was then provided thereon and was allowed to stand for 12 hours, thereby forming an entire solid electrolyte in a film shape. Subsequently, after the solidification, the PET film was removed, and the counter electrode was provided on the entire solid electrolyte, followed by sealing using a heat sealable film.

The preparation conditions of the mixed solutions according to the examples and comparative examples described above are shown in Table 9.

TABLE 9

| | First compound | Second compound |
|---|---|---|
| Example 46 | polyethylene glycol triacrylate | 4,4'-trimethylenedipiperidine |
| Example 47 | polyethylene glycol diacrylate | polyethylene glycol tripiperidine |
| Example 48 | polyethylene glycol triacrylate | polyethylene glycol tripiperidine |
| Example 49 | polyethylene glycol triacrylate | polyethylene glycol triamine |
| Example 50 | polyethylene glycol triacrylate | polyethyleneimine (molecular weight of 600) |
| Comparative example 49 | polyethylene glycol triacrylate | — |
| Comparative example 50 | polyethylene glycol diacrylate | — |
| Comparative example 51 | polyethylene glycol triacrylate | 4,4'-trimethylenedipiperidine |
| Comparative example 52 | polyethylene glycol diacrylate | polyethylene glycol tripiperidine |
| Comparative example 53 | polyethylene glycol triacrylate | polyethylene glycol tripiperidine |
| Comparative example 54 | polyethylene glycol triacrylate | polyethylene glycol triamine |
| Comparative example 55 | polyethylene glycol triacrylate | polyethyleneimine (molecular weight of 600) |

Solar-energy conversion efficiencies of the dye-sensitized solar cells of Examples 46 to 50 and Comparative Examples 49 to 55 formed as described above were evaluated. The results are shown in Table 10.

TABLE 10

| | Gelation | Solar-energy conversion efficiency (%) |
|---|---|---|
| Example 46 | ○ | 1.5 |
| Example 47 | ○ | 1.6 |
| Example 48 | ○ | 1.7 |
| Example 49 | ○ | 1.7 |
| Example 50 | ○ | 1.6 |
| Comparative example 49 | X | 0.5*[5] |
| Comparative example 50 | X | 0.5*[5] |
| Comparative example 51 | ○ | 0.8 |
| Comparative example 52 | ○ | 0.8 |
| Comparative example 53 | ○ | 0.7 |
| Comparative example 54 | ○ | 0.7 |
| Comparative example 55 | ○ | 0.5 |

*[5]indicates a reference value since no gelation occurred.

In addition, the individual dye-sensitized solar cells were each decomposed after the measurement of the solar-energy conversion efficiency so that an electrolyte portion provided inside the solar cell was recovered, and the entire solidification of the electrolyte composition was confirmed by visual inspection. The results are also shown in Table 10. In Table 10, ○ indicates that entire solidification occurred, and x indicates that entire solidification did not occur.

As can be seen from Table 10, in Comparative Examples 42 and 43 in which a conventional radical polymerization method was used, it is understood that the entire solidification of the electrolyte composition does not in situ occur in the dye-sensitized solar cell. On the other hand, in Examples 46 to 50 in which the first compound having at least two unsaturated double bonds and the second compound having at least two nucleophilic groups containing active hydrogen were polymerized by the Michael addition reaction, it is understood that the electrolyte composition is in situ gelled in the dye-sensitized solar cell and that the entire solid electrolyte is obtained.

From the above results, it is understood that when the first compound having at least two unsaturated double bonds and the second compound having at least two nucleophilic groups containing active hydrogen are polymerized by the Michael addition reaction, the electrolyte composition can be in situ and entirely solidified in the dye-sensitized solar cell and that the entire solid electrolyte can be obtained.

In addition, as can be seen from Table 10, in Examples 46 to 50 according to the present invention in which the first compound having at least two unsaturated double bonds and the second compound having at least two nucleophilic groups containing active hydrogen were polymerized in the dye-sensitized solar cell by the Michael addition reaction so that the entire solidification was in situ performed, it is understood that a high solar-energy conversion efficiency can be obtained as compared to that obtained in Comparative Examples 51 to 55 in which the dye-sensitized solar cell was formed by the steps of forming the entire solid electrolyte beforehand on the semiconductor layer, and providing the counter electrode on the entire solid electrolyte.

The reason the solar-energy conversion efficiency is high is believed that, in Examples 46 to 50, since the electrolyte solution is entirely solidified while being in contact with the electrode surface, the chemical bonding condition at the electrochemical interface between the entire solid electrolyte and the electrode surface is improved and hence the resistance is decreased. On the other hand, the reason the solar-energy conversion efficiency is low is believed that, in Comparative Examples 51 to 55, since the chemical bonding condition at the electrochemical interface between the electrode surface and the entire solid electrolyte which is entirely solidified beforehand is not satisfactory, the resistance is increased.

From the above results, it is understood that when the first compound having at least two isocyanate groups and the second compound having at least two nucleophilic groups containing active hydrogen are polymerized by the Michael addition reaction in the dye-sensitized solar cell, the electrolyte composition can be in situ and entirely solidified in the dye-sensitized solar cell so as to form the entire solid electrolyte. Accordingly, it is said that when the entire solid electrolyte described above is used, a dye-sensitized solar cell having superior solar-energy conversion efficiency can be realized.

Experiment 6

In Experiment 6, a photovoltaic device provided with another gel electrolyte of the present invention was investigated.

Example 51

In Example 51, a dye-sensitized solar cell was formed in the same manner as that in Example 1 except that the gel electrolyte was formed by preparing an ionic liquid as described below.

First, in 1-ethyl-3-methylimidazolium (hereinafter referred to as "EMI")-bis(trifluoromethanesulfonyl)imide (TFSI), 0.9 M of 1-propyl-2,3-dimethylimidazolium iodide, 30 mM of iodine ($I_2$), and 0.5 M of 4-tert-butylpyridine were dissolved, so that an ionic liquid containing a redox couple was prepared.

Next, polyethylene glycol triacrylate (molecular weight of 3,000) as the first compound having at least two unsaturated double bonds was mixed with the ionic liquid, and 4,4'-trimethylenedipiperidine was then mixed as the second compound having at least two nucleophilic groups containing active hydrogen, thereby preparing the mixed solution. The mixing ratio on a molar basis of the unsaturated double bond to the nucleophilic group containing active hydrogen was set to 1 to 1, and the polyethylene glycol triacrylate and the 4,4'-trimethylenedipiperidine were mixed so that the total thereof is 6 percent by weight with respect to the ionic liquid.

After several droplets of the mixed solution were dripped in the inlet opening of the device assembled beforehand, evacuation was performed at a temperature of 50° C. so that the mixed solution was injected into the device, and subsequently, the inlet opening was sealed with a heat sealable film and a glass plate. After the injection, this device was allowed to stand for 12 hours at room temperature, and as a result, a dye-sensitized solar cell provided with a gel electrolyte was obtained, the gel electrolyte being formed by gelation of the ionic liquid containing a redox couple.

Example 52

A dye-sensitized solar cell was formed in the same manner as that in Example 51 except that polyethylene glycol diacrylate was used as the first compound and that polyethylene glycol tripiperidine was used as the second compound.

Example 53

A dye-sensitized solar cell was formed in the same manner as that in Example 51 except that polyethylene glycol tripiperidine was used as the second compound.

Example 54

A dye-sensitized solar cell was formed in the same manner as that in Example 51 except that polyethylene glycol triamine was used as the second compound.

Example 55

A dye-sensitized solar cell was formed in the same manner as that in Example 51 except that polyethyleneimine (molecular weight of 600) was used as the second compound.

Example 56

A dye-sensitized solar cell was formed in the same manner as that in Example 51 except that EMI-iodide was used for the ionic liquid, and 30 mM of iodine ($I_2$) as a redox seed and 0.5 M of 4-tert-butylpyridine were dissolved therein so that an ionic liquid containing a redox couple was prepared.

Example 57

A dye-sensitized solar cell was formed in the same manner as that in Example 56 except that polyethylene glycol diacrylate was used as the first compound and that polyethylene glycol tripiperidine was used as the second compound.

Example 58

A dye-sensitized solar cell was formed in the same manner as that in Example 56 except that polyethylene glycol tripiperidine was used as the second compound.

Example 59

A dye-sensitized solar cell was formed in the same manner as that in Example 56 except that polyethylene glycol triamine was used as the second compound.

Example 60

A dye-sensitized solar cell was formed in the same manner as that in Example 56 except that polyethyleneimine (molecular weight of 600) was used as the second compound.

Comparative Example 51

A dye-sensitized solar cell was formed in the same manner as that in Example 51 except that the first compound and the second compound were not mixed with the ionic liquid.

Comparative Example 52

A dye-sensitized solar cell was formed in the same manner as that in Example 56 except that the first compound and the second compound were not mixed with the ionic liquid.

Comparative Example 53

A dye-sensitized solar cell was formed in the same manner as that in Example 51 except that the mixed solution was prepared by mixing 6 percent by weight of polyethylene glycol triacrylate and 0.15 percent by weight of tert-butyl peroxypivalate as a radical polymerization initiator with respect to the ionic liquid of Example 51 and that after injected, this mixed solution was allowed to stand at 60° C. for 1 hour.

Comparative Example 54

A dye-sensitized solar cell was formed in the same manner as that in Example 51 except that the mixed solution was prepared by mixing 6 percent by weight of polyethylene glycol diacrylate and 0.15 percent by weight of tert-butyl peroxypivalate as a radical polymerization initiator with respect to the ionic liquid of Example 51 and that after injected, this mixed solution was allowed to stand at 60° C. for 1 hour.

Comparative Example 55

A dye-sensitized solar cell was formed in the same manner as that in Example 56 except that the mixed solution was prepared by mixing 6 percent by weight of polyethylene glycol triacrylate and 0.15 percent by weight of tert-butyl peroxypivalate as a radical polymerization initiator with respect to the ionic liquid of Example 56 and that after injected, this mixed solution was allowed to stand at 60° C. for 1 hour.

Comparative Example 56

A dye-sensitized solar cell was formed in the same manner as that in Example 56 except that the mixed solution was prepared by mixing 6 percent by weight of polyethylene glycol diacrylate and 0.15 percent by weight of tert-butyl peroxypivalate as a radical polymerization initiator with respect to the ionic liquid of Example 56 and that after injected, this mixed solution was allowed to stand at 60° C. for 1 hour.

Comparative Example 57

A dye-sensitized solar cell was formed in the same manner as that in Example 51 except those described below. After the mixed solution was prepared in the same manner as that in Example 51, several droplets of the mixed solution were dripped onto the $TiO_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was then provided on the gel electrolyte layer, followed by sealing using a heat sealable film.

Comparative Example 58

A dye-sensitized solar cell was formed in the same manner as that in Example 52 except those described below. After the mixed solution was prepared in the same manner as that in Example 52, several droplets of the mixed solution were dripped onto the $TiO_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was then provided on the gel electrolyte layer, followed by sealing using a heat sealable film.

Comparative Example 59

A dye-sensitized solar cell was formed in the same manner as that in Example 53 except those described below. After the mixed solution was prepared in the same manner as that in Example 53, several droplets of the mixed solution were dripped onto the $TiO_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was then provided on the gel electrolyte layer, followed by sealing using a heat sealable film.

Comparative Example 60

A dye-sensitized solar cell was formed in the same manner as that in Example 54 except those described below. After the mixed solution was prepared in the same manner as that in Example 54, several droplets of the mixed solution were dripped onto the $TiO_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was then provided on the gel electrolyte layer, followed by sealing using a heat sealable film.

Comparative Example 61

A dye-sensitized solar cell was formed in the same manner as that in Example 55 except those described below. After the mixed solution was prepared in the same manner as that in Example 55, several droplets of the mixed solution were dripped onto the $TiO_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was then provided on the gel electrolyte layer, followed by sealing using a heat sealable film.

Comparative Example 62

A dye-sensitized solar cell was formed in the same manner as that in Example 56 except those described below. After the mixed solution was prepared in the same manner as that in Example 56, several droplets of the mixed solution were dripped onto the $TiO_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was then provided on the gel electrolyte layer, followed by sealing using a heat sealable film.

Comparative Example 63

A dye-sensitized solar cell was formed in the same manner as that in Example 57 except those described below. After the mixed solution was prepared in the same manner as that in Example 57, several droplets of the mixed solution were dripped onto the $TiO_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was then provided on the gel electrolyte layer, followed by sealing using a heat sealable film.

Comparative Example 64

A dye-sensitized solar cell was formed in the same manner as that in Example 58 except those described below. After the mixed solution was prepared in the same manner as that in Example 58, several droplets of the mixed solution were dripped onto the $TiO_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was then provided on the gel electrolyte layer, followed by sealing using a heat sealable film.

Comparative Example 65

A dye-sensitized solar cell was formed in the same manner as that in Example 59 except those described below. After the mixed solution was prepared in the same manner as that in Example 59, several droplets of the mixed solution were dripped onto the TiO$_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was then provided on the gel electrolyte layer, followed by sealing using a heat sealable film.

Comparative Example 66

A dye-sensitized solar cell was formed in the same manner as that in Example 60 except those described below. After the mixed solution was prepared in the same manner as that in Example 60, several droplets of the mixed solution were dripped onto the TiO$_2$ film which was the semiconductor layer, and a polyethylene terephthalate (PET) film was then provided thereon and was allowed to stand for 12 hours, thereby forming a gel electrolyte layer in a film shape. Subsequently, after the gelation, the PET film was removed, and the counter electrode was then provided on the gel electrolyte layer, followed by sealing using a heat sealable film.

The preparation conditions of the mixed solutions according to the examples and comparative examples described above are shown in Table 11.

TABLE 11

| | First compound | Second compound |
|---|---|---|
| Example 51 | polyethylene glycol triacrylate | 4,4'-trimethylenedipiperidine |
| Example 52 | polyethylene glycol diacrylate | polyethylene glycol tripiperidine |
| Example 53 | polyethylene glycol triacrylate | polyethylene glycol tripiperidine |
| Example 54 | polyethylene glycol triacrylate | polyethylene glycol triamine |
| Example 55 | polyethylene glycol triacrylate | polyethyleneimine (molecular weight of 600) |
| Example 56 | polyethylene glycol triacrylate | 4,4'-trimethylenedipiperidine |
| Example 57 | polyethylene glycol diacrylate | polyethylene glycol tripiperidine |
| Example 58 | polyethylene glycol triacrylate | polyethylene glycol tripiperidine |
| Example 59 | polyethylene glycol triacrylate | polyethylene glycol triamine |
| Example 60 | polyethylene glycol triacrylate | polyethyleneimine (molecular weight of 600) |
| Comparative example 51 | No addition | No addition |
| Comparative example 52 | No addition | No addition |
| Comparative example 53 | polyethylene glycol triacrylate | — |
| Comparative example 54 | polyethylene glycol diacrylate | — |
| Comparative example 55 | polyethylene glycol triacrylate | — |
| Comparative example 56 | polyethylene glycol diacrylate | — |
| Comparative example 57 | polyethylene glycol triacrylate | 4,4'-trimethylenedipiperidine |
| Comparative example 58 | polyethylene glycol diacrylate | polyethylene glycol tripiperidine |
| Comparative example 59 | polyethylene glycol triacrylate | polyethylene glycol tripiperidine |
| Comparative example 60 | polyethylene glycol triacrylate | polyethylene glycol triamine |
| Comparative example 61 | polyethylene glycol triacrylate | polyethyleneimine (molecular weight of 600) |
| Comparative example 62 | polyethylene glycol triacrylate | 4,4'-trimethylenedipiperidine |

TABLE 11-continued

| | First compound | Second compound |
|---|---|---|
| Comparative example 63 | polyethylene glycol diacrylate | polyethylene glycol tripiperidine |
| Comparative example 64 | polyethylene glycol diacrylate | polyethylene glycol tripiperidine |
| Comparative example 65 | polyethylene glycol triacrylate | polyethylene glycol triamine |
| Comparative example 66 | polyethylene glycol triacrylate | polyethyleneimine (molecular weight of 600) |

Solar-energy conversion efficiencies of the dye-sensitized solar cells of Examples 51 to 60 and Comparative Examples 51 to 66 formed as described above were evaluated. The results are shown in Table 12.

TABLE 12

| | Gelation | Solar-energy conversion efficiency (%) |
|---|---|---|
| Example 51 | ◯ | 1.2 |
| Example 52 | ◯ | 1.3 |
| Example 53 | ◯ | 1.3 |
| Example 54 | ◯ | 1.2 |
| Example 55 | ◯ | 1.1 |
| Example 56 | ◯ | 1.1 |
| Example 57 | ◯ | 1.2 |
| Example 58 | ◯ | 1.2 |
| Example 59 | ◯ | 1.1 |
| Example 60 | ◯ | 1.0 |
| Comparative example 51 | X | 1.5*[6] |
| Comparative example 52 | X | 1.3*[6] |
| Comparative example 53 | X | 0.7*[6] |
| Comparative example 54 | X | 0.6*[6] |
| Comparative example 55 | X | 0.4*[6] |
| Comparative example 56 | X | 0.4*[6] |
| Comparative example 57 | ◯ | 0.8 |
| Comparative example 58 | ◯ | 0.8 |
| Comparative example 59 | ◯ | 0.8 |
| Comparative example 60 | ◯ | 0.7 |
| Comparative example 61 | ◯ | 0.6 |
| Comparative example 62 | ◯ | 0.8 |
| Comparative example 63 | ◯ | 0.8 |
| Comparative example 64 | ◯ | 0.7 |
| Comparative example 65 | ◯ | 0.7 |
| Comparative example 66 | ◯ | 0.5 |

*[6]indicates a reference value since no gelation occurred.

In addition, the individual dye-sensitized solar cells were each decomposed after the measurement of the solar-energy conversion efficiency so that an electrolyte portion provided inside the solar cell was recovered, and the gelation of the electrolyte was confirmed by visual inspection. The results are also shown in Table 12. In Table 12, ◯ indicates that gelation occurred, and x indicates that gelation did not occur.

As can be seen from Table 12, in Comparative Examples 53 to 56 in which a conventional radical polymerization method was used, it is understood that the ionic liquid containing a redox couple is not in situ gelled in the dye-sensitized solar cell. On the other hand, in Examples 51 to 60 in which the first compound having at least two unsaturated double bonds and the second compound having at least two nucleophilic groups containing active hydrogen were polymerized by the Michael addition reaction, it is understood that the ionic liquid containing a redox couple is in situ gelled in the dye-sensitized solar cell and that the gel electrolyte is obtained.

From the above results, it is understood that when the first compound having at least two unsaturated double bonds and the second compound having at least two nucleophilic groups containing active hydrogen are polymerized by the Michael addition reaction, the ionic liquid containing a redox couple can be in situ gelled in the dye-sensitized solar cell and that the gel electrolyte is obtained.

In addition, when Examples 51 to 60 are compared to Comparative Examples 51 and 52, since the decrease in solar-energy conversion efficiency of the dye-sensitized solar cell having the gel electrolyte of the present invention is small as compared to that of the dye-sensitized solar cell formed of the ionic liquid containing a redox couple, it is said that a superior dye-sensitized solar cell having a superior solar-energy conversion efficiency is realized.

In addition, as can be seen from Table 12, in Comparative Examples 57 to 66 in which the gel electrolyte was formed beforehand on the semiconductor layer by polymerizing the first compound having at least two unsaturated double bonds and the second compound having at least two nucleophilic groups containing active hydrogen in accordance with the Michael addition reaction and in which the dye-sensitized solar cell was formed by providing the counter electrode on the gel electrolyte thus formed, it is understood that although the gel electrolyte is obtained, compared to the dye-sensitized solar cell formed using the ionic liquid containing a redox couple, the solar-energy conversion efficiency is very much decreased. The reason for this is believed that since the chemical bonding condition at the electrochemical interface between the gel electrolyte which is formed beforehand by gelation and the electrode surface is not satisfactory, the resistance is increased.

On the other hand, in Examples 51 to 60 according to the present invention in which the first compound having at least two unsaturated double bonds and the second compound having at least two nucleophilic groups containing active hydrogen were polymerized in the dye-sensitized solar cell by the Michael addition reaction so that gelation was in situ performed, it is understood that the decrease in solar-energy conversion efficiency is small as compared to that of the dye-sensitized solar cell formed using the ionic liquid containing a redox couple and that hence a superior solar-energy conversion efficiency is obtained. The reason for this is believed that since the mixed solution is gelled while being in contact with the electrode surface, the chemical bonding condition at the electrochemical interface between the gel electrolyte and the electrode surface is improved and hence the resistance is decreased.

From the above results, it is understood that when the first compound having at least two unsaturated double bonds and the second compound having at least two nucleophilic groups containing active hydrogen are polymerized in the dye-sensitized solar cell by the Michael addition reaction, the ionic liquid containing a redox couple can be in situ gelled in the dye-sensitized solar cell so as to form the gel electrolyte. Accordingly, it is said that when the gel electrolyte described above is used, a dye-sensitized solar cell having superior solar-energy conversion efficiency can be realized.

INDUSTRIAL APPLICABILITY

The solid electrolyte of the present invention is a solid electrolyte having an electrolyte composition and a matrix polymer, and the matrix polymer is formed by polymerization of a first compound having at least two isocyanate groups and a second compound having at least two nucleophilic groups containing active hydrogen in accordance with a polyaddition reaction. In the polymerization, a precursor for the matrix polymer is brought into contact with a surface on which the solid electrolyte is to be formed and is then polymerized to form the matrix polymer.

In addition, another solid electrolyte of the present invention is a solid electrolyte having an electrolyte composition and a matrix polymer, and the matrix polymer is formed by polymerization of a first compound having at least two unsaturated double bonds and a second compound having at least two nucleophilic groups containing active hydrogen in accordance with the Michael addition reaction. In the polymerization, a precursor for the matrix polymer is brought into contact with a surface on which the solid electrolyte is to be formed and is then polymerized for forming the matrix polymer.

According to the solid electrolyte having the structure as described above, since the precursor, which is in a state before polymerization and has fluidity, is brought into contact with the surface, such as an electrode surface, on which the solid electrolyte is to be formed, followed by polymerization, the solid electrolyte can be in situ formed, for example, in a cell device, and hence the chemical bonding condition at the electrochemical interface between the solid electrolyte and the electrode surface is improved. In addition, since the use of heat and active rays are not necessary in polymerization, the electrolyte composition is not degraded by the use of heat and active rays in production.

In addition, since being a polymer formed by polymerization of the above first and the second compounds and having a chemically cross-linking structure, the matrix polymer of this solid electrolyte is not changed into a liquid form by application of heat, and hence superior mechanical properties and durability can be obtained.

Hence, according to the solid electrolyte of the present invention, an electrolyte having superior conductive properties can be realized.

In addition, a photovoltaic device using the solid electrolyte of the present invention is a photovoltaic device which has an electrolyte layer and a semiconductor layer composed of semiconductor particles carrying a dye, the layers being provided between a counter electrode and an electrode formed on a surface of a transparent substrate. The electrolyte layer has a redox couple, an electrolyte composition, and a matrix polymer, and the matrix polymer is formed by polymerization of a first compound having at least two isocyanate groups and a second compound having at least two nucleophilic groups containing active hydrogen in accordance with a polyaddition reaction. In addition, a precursor for the matrix polymer is brought into contact with a surface on which the solid electrolyte is to be formed and is then polymerized.

In addition, a method for preparing this photovoltaic device is a method for preparing a photovoltaic device which has an electrolyte layer and a semiconductor layer composed of semiconductor particles carrying a dye, the layers being provided between a counter electrode and an electrode formed on a surface of a transparent substrate. In this method, after the photovoltaic device is assembled, a mixed solution is injected into the photovoltaic device, the mixed solution containing a first compound having at least two isocyanate groups, a second compound having at least two nucleophilic groups containing active hydrogen, and an electrolyte composition including a redox couple, and the first compound and the second compound are polymerized in the photovoltaic device in accordance with a polyaddition reaction for solidification, so that the above electrolyte layer is formed.

In addition, another photovoltaic device of the present invention is a photovoltaic device which has an electrolyte layer and a semiconductor layer composed of semiconductor particles carrying a dye, the layers being provided between a counter electrode and an electrode formed on a surface of a transparent substrate. The electrolyte layer has a redox couple, an electrolyte composition, and a matrix polymer, and the matrix polymer is formed by polymerization of a first compound having at least two unsaturated double bonds and a second compound having at least two nucleophilic groups containing active hydrogen in accordance with the Michael addition reaction. In addition, a precursor for the matrix polymer is brought into contact with a surface on which the solid electrolyte is to be formed and is then polymerized to form the matrix polymer.

In addition, a method for preparing this photovoltaic device is a method for preparing a photovoltaic device which has a solid electrolyte layer and a semiconductor layer composed of semiconductor particles carrying a dye, the layers being provided between a counter electrode and an electrode formed on a surface of a transparent substrate. In this method, after the photovoltaic device is assembled, a mixed solution is injected into the photovoltaic device, the mixed solution containing a first compound having at least two unsaturated double bonds, a second compound having at least two nucleophilic groups containing active hydrogen, and an electrolyte composition including a redox couple, and the first compound and the second compound are polymerized in the photovoltaic device by the Michael addition reaction for solidification, so that the solid electrolyte layer is formed.

According to the photovoltaic device of the present invention, the mixed solution which is in a state before polymerization and which has fluidity is injected into the photovoltaic device, followed by polymerization, thereby forming the solid electrolyte of the present invention. Hence, the solid electrolyte can be in situ formed in a cell device, and as a result, a photovoltaic device having superior solar-energy conversion efficiency can be easily and reliably realized.

The invention claimed is:

1. A method of forming an electrolyte layer comprising an electrolyte composition and a matrix polymer, the method comprising:
   forming the matrix polymer by polymerization of a first compound having at least three isocyanate groups and a second compound having at least two nucleophilic groups containing active hydrogen, wherein said polymerization is performed in accordance with a Michael addition reaction and wherein said polymerization is performed after a precursor for the matrix polymer is brought into contact with a surface on which the electrolyte is to be formed;
   wherein the electrolyte layer is formed between two electrodes.

2. The method according to claim 1, wherein the electrolyte composition comprises a solvent to form a gel electrolyte.

3. The method according to claim 1, wherein the electrolyte composition comprises no solvent to form a solid electrolyte.

4. The method according to claim 1, wherein the electrolyte composition comprises an ionic liquid to form a gel electrolyte.

5. The method according to claim 1, wherein the electrolyte composition comprises a redox couple.

6. The method according to claim 5, wherein the redox couple is a combination of a halogen ion and a halide ion.

7. The method according to claim 6, wherein a halogen portion of the redox couple is iodine.

8. A photocell comprising: a semiconductor layer composed of semiconductor particles carrying a dye and an electrolyte layer, the layers being provided between a counter electrode and an electrode formed on a surface of a substrate;
   wherein the electrolyte layer has a redox couple, an electrolyte composition, and a matrix polymer; and
   wherein the matrix polymer is a polymer formed by polymerization of a first compound having at least three isocyanate groups and a second compound having at least two nucleophilic groups containing active hydrogen, wherein said polymerization is performed in accordance with a Michael addition reaction.

9. The photocell according to claim 8, wherein the substrate is a transparent substrate.

10. A method for manufacturing a photocell comprising:
    injecting a mixed solution between a counter electrode and an electrode formed on a surface of a substrate, the mixed solution containing a first compound having at least three isocyanate groups, a second compound having at least two nucleophilic groups containing active hydrogen, and an electrolyte composition having a redox couple; and
    polymerizing, in accordance with a Michael addition reaction, the first compound and the second compound after the mixed solution is brought into contact with the electrode formed on the surface of the substrate.

11. The method for manufacturing a photocell, according to claim 10, further comprising forming a semiconductor layer, composed of semiconductor particles carrying a dye, between the electrode and the counter electrode.

12. The method for manufacturing a photocell, according to claim 10, wherein the electrolyte composition has a redox couple.

13. A method for manufacturing a photocell comprising:
    forming a semiconductor layer composed of semiconductor particles carrying a dye between a counter electrode and an electrode formed on a surface of a substrate;
    applying a first compound having at least three isocyanate groups and a second compound having at least two nucleophilic groups containing active hydrogen; and
    polymerizing, in accordance with a Michael addition reaction, the first compound and the second compound.

* * * * *